(12) United States Patent
Kumar et al.

(10) Patent No.: US 10,778,473 B2
(45) Date of Patent: Sep. 15, 2020

(54) COVERAGE MODE BASED OBSERVED TIME DIFFERENCE OF ARRIVAL POSITIONING

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/918,923

(22) Filed: Mar. 12, 2018

(65) Prior Publication Data

US 2019/0280898 A1 Sep. 12, 2019

(51) Int. Cl.
*H04L 25/02* (2006.01)
*H04L 5/00* (2006.01)
*H04W 4/02* (2018.01)
*H04W 24/10* (2009.01)
*H04L 1/00* (2006.01)

(52) U.S. Cl.
CPC ........ *H04L 25/0224* (2013.01); *H04L 5/0048* (2013.01); *H04W 4/025* (2013.01); *H04W 24/10* (2013.01); *H04L 1/0025* (2013.01)

(58) Field of Classification Search
CPC . H04L 25/0224; H04L 5/0048; H04L 1/0025; H04W 4/025; H04W 24/10
See application file for complete search history.

(56) References Cited

U.S. PATENT DOCUMENTS

| | | | |
|---|---|---|---|
| 6,947,894 B1* | 9/2005 | Engstrom | G06F 1/3203 704/270 |
| 2011/0211460 A1* | 9/2011 | Beeler | H04L 43/0847 370/245 |
| 2012/0083288 A1 | 4/2012 | Siomina | |
| 2012/0252487 A1 | 10/2012 | Siomina et al. | |

(Continued)

FOREIGN PATENT DOCUMENTS

| | | |
|---|---|---|
| EP | 3148269 A1 | 3/2017 |
| EP | 3166354 A1 | 5/2017 |
| WO | 2017123144 A1 | 7/2017 |

*Primary Examiner* — Walter J Divito
*Assistant Examiner* — Anthony Luo
(74) *Attorney, Agent, or Firm* — Paradice and Li LLP

(57) ABSTRACT

A User Equipment (UE) may receive a coverage mode transition request at a first time and upon determining that the coverage mode transition request includes a request to transition to an Enhanced Coverage (EC) mode, the UE may determine, based on parameters in the coverage mode transition request, an expected communication delay for transmission of a Reference Signal Time Difference (RSTD) measurement report. The UE may initiate transmission of the RSTD measurement report for the positioning measurement session at a second time not exceeding a specified RSTD measurement time. The second time may precede an RSTD measurement timeout time for the positioning measurement session by at least the expected communication delay. Disclosed embodiments also pertain to communication of the expected communication delay between a Location Server (e.g. Evolved Serving Mobile Location Center) and a Base Station (e.g. evolved NodeB) using Long Term Evolution Positioning Protocol Annex (LPPa) messages.

28 Claims, 16 Drawing Sheets

(56) References Cited

U.S. PATENT DOCUMENTS

| | | |
|---|---|---|
| 2015/0365790 A1 | 12/2015 | Edge et al. |
| 2017/0059689 A1 | 3/2017 | Edge et al. |
| 2017/0135005 A1 | 5/2017 | Basu et al. |
| 2017/0171764 A1 | 6/2017 | Dimou et al. |
| 2017/0288845 A1 | 10/2017 | Axmon et al. |
| 2017/0289952 A1 | 10/2017 | Muquet |
| 2018/0124771 A1* | 5/2018 | Mok ................... H04W 24/10 |
| 2018/0334138 A1* | 11/2018 | Namineni ............ H04W 76/10 |
| 2018/0343612 A1* | 11/2018 | Akula ................ H04W 52/0212 |
| 2019/0045577 A1* | 2/2019 | Kim .................... H04W 76/50 |
| 2019/0280899 A1 | 9/2019 | Kumar et al. |

* cited by examiner

COVERAGE MODE BASED OBSERVED TIME DIFFERENCE OF ARRIVAL POSITIONING

FIELD

The subject matter disclosed herein relates to User Equipment (UE) location determination, and, in particular, to Observed Time Difference Of Arrival (OTDOA) positioning for various coverage modes including during coverage mode transitions.

BACKGROUND

It is often desirable to know the location of a UE, which may take the form of a mobile terminal, an Internet of Things (IoT) device, etc. UEs may use positioning services to determine their locations. For example, mobile phones, wearables, asset tracking devices, logistical support devices, etc. may request and/or use positioning services. In some instances, because of signaling environment, location, power, and/or cost considerations, UEs may operate or may be requested to operate in a "Coverage Enhanced" or "Enhanced Coverage" (hereinafter referred to collectively as "EC") mode. For example, a UE connected to a Base Station ("BS") may move out of a "normal coverage" ("NC") region (e.g. with acceptable signal quality) into an EC region (e.g. with poor signal quality). To maintain communication session continuity and/or reliability, the UE may be re-configured from NC mode to EC mode. In EC mode, repetitions of some messages may be used to facilitate increased coverage. The number of repetitions in EC mode can be significant (e.g. in the hundreds) and may have an impact on effective message communication delay. Thus, in EC mode, positioning related messages including messages with Reference Signal Time Difference (RSTD) measurements by the UE may be received at a Position Determination Entity (PDE) such as a Location Server (LS) later than some specified positioning measurement session timeout period thereby detrimentally affecting UE location determination.

SUMMARY

In some embodiments, a method at a User Equipment (UE) may comprise: receiving a coverage mode transition request at a first time (t1); and in response to a determination that the coverage mode transition request includes a request to transition to an Enhanced Coverage (EC) mode, determining, based on one or more parameters in the coverage mode transition request, an expected communication delay ($T_{CE-X}$) for transmission of a Reference Signal Time Difference (RSTD) measurement report for a positioning measurement session, and initiating transmission of the RSTD measurement report at a second time (t2) not exceeding a specified RSTD measurement time.

In another aspect, a User Equipment (UE) may comprise: a processor coupled to a transceiver, wherein the processor is configured to: receive, via the transceiver, a coverage mode transition request at a first time (t1); and in response to a determination that the coverage mode transition request includes a request to transition to an Enhanced Coverage (EC) mode, determine, based on one or more parameters in the coverage mode transition request, an expected communication delay ($T_{CE-X}$) for transmission of a Reference Signal Time Difference (RSTD) measurement report for a positioning measurement session, and initiate transmission of the RSTD measurement report at a second time (t2) not exceeding a specified RSTD measurement time.

In a further aspect, a UE may comprise: means for receiving a coverage mode transition request at a first time (t1); and in response to a determination that the coverage mode transition request includes a request to transition to an Enhanced Coverage (EC) mode, means for determining, based on one or more parameters in the coverage mode transition request, an expected communication delay ($T_{CE-X}$) for transmission of a Reference Signal Time Difference (RSTD) measurement report for a positioning measurement session, and means for initiating transmission of the RSTD measurement report at a second time (t2) not exceeding a specified RSTD measurement time.

In some embodiments, a non-transitory computer-readable medium may comprise instructions to configure a processor on a User Equipment (UE) to: receive a coverage mode transition request at a first time (t1); and in response to a determination that the coverage mode transition request includes a request to transition to an Enhanced Coverage (EC) mode, determine, based on one or more parameters in the coverage mode transition request, an expected communication delay ($T_{CE-X}$) for transmission of a Reference Signal Time Difference (RSTD) measurement report for a positioning measurement session, and initiate transmission of the RSTD measurement report at a second time (t2) not exceeding a specified RSTD measurement time.

In some embodiments, a method on a Base Station (BS) may comprise: determining, based on information related to a transition to an enhanced coverage (EC) mode for a User Equipment (UE) communicatively coupled to the BS, an expected communication delay ($T_{CE-X}$) for transmission of an Reference Signal Time Difference (RSTD) measurement report by the UE in the EC mode; and sending a message comprising the expected communication delay ($T_{CE-X}$) to a Location Server (LS). In some embodiments, the message may further comprise an indication that the expected communication delay ($T_{CE-X}$) is related to the transition to the EC mode by the UE. In some embodiments, the message, which may comprise the expected communication delay (TCE-X) and/or the indication that the expected communication delay ($T_{CE-X}$) is related to the transition to the EC mode by the UE, may be sent to the LS using a Long Term Evolution Positioning Protocol Annex (LPPa) protocol. In some embodiments, the LS may comprise an Evolved Serving Mobile Location Center (E-SMLC); and the BS may comprise an Evolved Node B (eNB).

In another aspect, a Base Station (BS) may comprise a processor, wherein the processor is configured to: determine, based on information related to a transition to an enhanced coverage (EC) mode for a User Equipment (UE) communicatively coupled to the BS, an expected communication delay ($T_{CE-X}$) for transmission of an Reference Signal Time Difference (RSTD) measurement report by the UE in the EC mode; and send a message comprising the expected communication delay ($T_{CE-X}$) to a Location Server (LS). In some embodiments, the message may further comprise an indication that the expected communication delay ($T_{CE-X}$) is related to the transition to the EC mode by the UE. In some embodiments, the message, which may comprise the expected communication delay (TCE-X) and/or the indication that the expected communication delay ($T_{CE-X}$) is related to the transition to the EC mode by the UE, may be sent to the LS using a Long Term Evolution Positioning Protocol Annex (LPPa) protocol. In some embodiments, the LS may comprise an Evolved Serving Mobile Location Center (E-SMLC); and the BS may comprise an Evolved Node B (eNB).

In a further aspect, a Base Station (BS) may comprise: means for determining, based on information related to a transition to an enhanced coverage (EC) mode for a User Equipment (UE) communicatively coupled to the BS, an expected communication delay ($T_{CE-X}$) for transmission of an Reference Signal Time Difference (RSTD) measurement report by the UE in the EC mode; and means for sending a message comprising the expected communication delay ($T_{CE-X}$) to a Location Server (LS). In some embodiments, the message may further comprise an indication that the expected communication delay ($T_{CE-X}$) is related to the transition to the EC mode by the UE. In some embodiments, means for sending the message, which may comprise the expected communication delay (TCE-X) and/or the indication that the expected communication delay ($T_{CE-X}$) is related to the transition to the EC mode by the UE, to the LS may use a Long Term Evolution Positioning Protocol Annex (LPPa) protocol. In some embodiments, the LS may comprise an Evolved Serving Mobile Location Center (E-SMLC); and the BS may comprise an Evolved Node B (eNB).

In some embodiments, a non-transitory computer-readable medium may comprise instructions to configure a processor on a Base Station (BS) to: determine, based on information related to a transition to an enhanced coverage (EC) mode for a User Equipment (UE) communicatively coupled to the BS, an expected communication delay ($T_{CE-X}$) for transmission of an Reference Signal Time Difference (RSTD) measurement report by the UE in the EC mode; and send a message comprising the expected communication delay ($T_{CE-X}$) to a Location Server (LS). In some embodiments, the message may further comprise an indication that the expected communication delay ($T_{CE-X}$) is related to the transition to the EC mode by the UE. In some embodiments, the message, which may comprise the expected communication delay (TCE-X) and/or the indication that the expected communication delay ($T_{CE-X}$) is related to the transition to the EC mode by the UE, may be sent to the LS using a Long Term Evolution Positioning Protocol Annex (LPPa) protocol. In some embodiments, the LS may comprise an Evolved Serving Mobile Location Center (E-SMLC); and the BS may comprise an Evolved Node B (eNB).

In some embodiments, a method at a Location Server (LS) may comprise: receiving, from a Base Station (BS), information related to a transition to an enhanced coverage (EC) mode for a User Equipment (UE) communicatively coupled to the BS, wherein the information related to the transition to the EC mode comprises an expected communication delay ($T_{CE-X}$) for transmission of an Reference Signal Time Difference (RSTD) measurement report by the UE in the EC mode. In some embodiments, the received information may further comprise an indication that the expected communication delay ($T_{CE-X}$) is related to the transition to the EC mode by the UE. In some embodiments, the LS may comprise an Evolved Serving Mobile Location Center (E-SMLC); and the BS may comprise an Evolved Node B (eNB).

In an aspect, a Location Server (LS) may comprise: a processor coupled to a communications interface, wherein the processor is configured to: receive, from a Base Station (BS) via the communications interface, information related to a transition to an enhanced coverage (EC) mode for a User Equipment (UE) communicatively coupled to the BS, wherein the information related to the transition to the EC mode comprises an expected communication delay ($T_{CE-X}$) for transmission of an Reference Signal Time Difference (RSTD) measurement report by the UE in the EC mode. In some embodiments, the received information may further comprise an indication that the expected communication delay ($T_{CE-X}$) is related to the transition to the EC mode by the UE. In some embodiments, the LS may comprise an Evolved Serving Mobile Location Center (E-SMLC); and the BS may comprise an Evolved Node B (eNB).

In a further aspect, a Location Server (LS) may comprise: means for receiving, from a Base Station (BS), information related to a transition to an enhanced coverage (EC) mode for a User Equipment (UE) communicatively coupled to the BS, wherein the information related to the transition to the EC mode comprises an expected communication delay ($T_{CE-X}$) for transmission of an Reference Signal Time Difference (RSTD) measurement report by the UE in the EC mode. In some embodiments, the received information may further comprise an indication that the expected communication delay ($T_{CE-X}$) is related to the transition to the EC mode by the UE. In some embodiments, the LS may comprise an Evolved Serving Mobile Location Center (E-SMLC); and the BS may comprise an Evolved Node B (eNB).

In some embodiments, a non-transitory computer-readable medium may comprise instructions to configure a processor on a Location Server (LS) to: receive, from a Base Station (BS), information related to a transition to an enhanced coverage (EC) mode for a User Equipment (UE) communicatively coupled to the BS, wherein the information related to the transition to the EC mode comprises an expected communication delay ($T_{CE-X}$) for transmission of an Reference Signal Time Difference (RSTD) measurement report by the UE in the EC mode. In some embodiments, the received information may further comprise an indication that the expected communication delay ($T_{CE-X}$) is related to the transition to the EC mode by the UE. In some embodiments, the LS may comprise an Evolved Serving Mobile Location Center (E-SMLC); and the BS may comprise an Evolved Node B (eNB).

The methods disclosed may be performed by one or more of UEs, BS', location servers using LPP, LPPa, or other protocols. Embodiments disclosed also relate to software, firmware, and program instructions created, stored, accessed, read, or modified by processors using computer readable media or computer readable memory.

DETAILED DESCRIPTION

Figure 1:
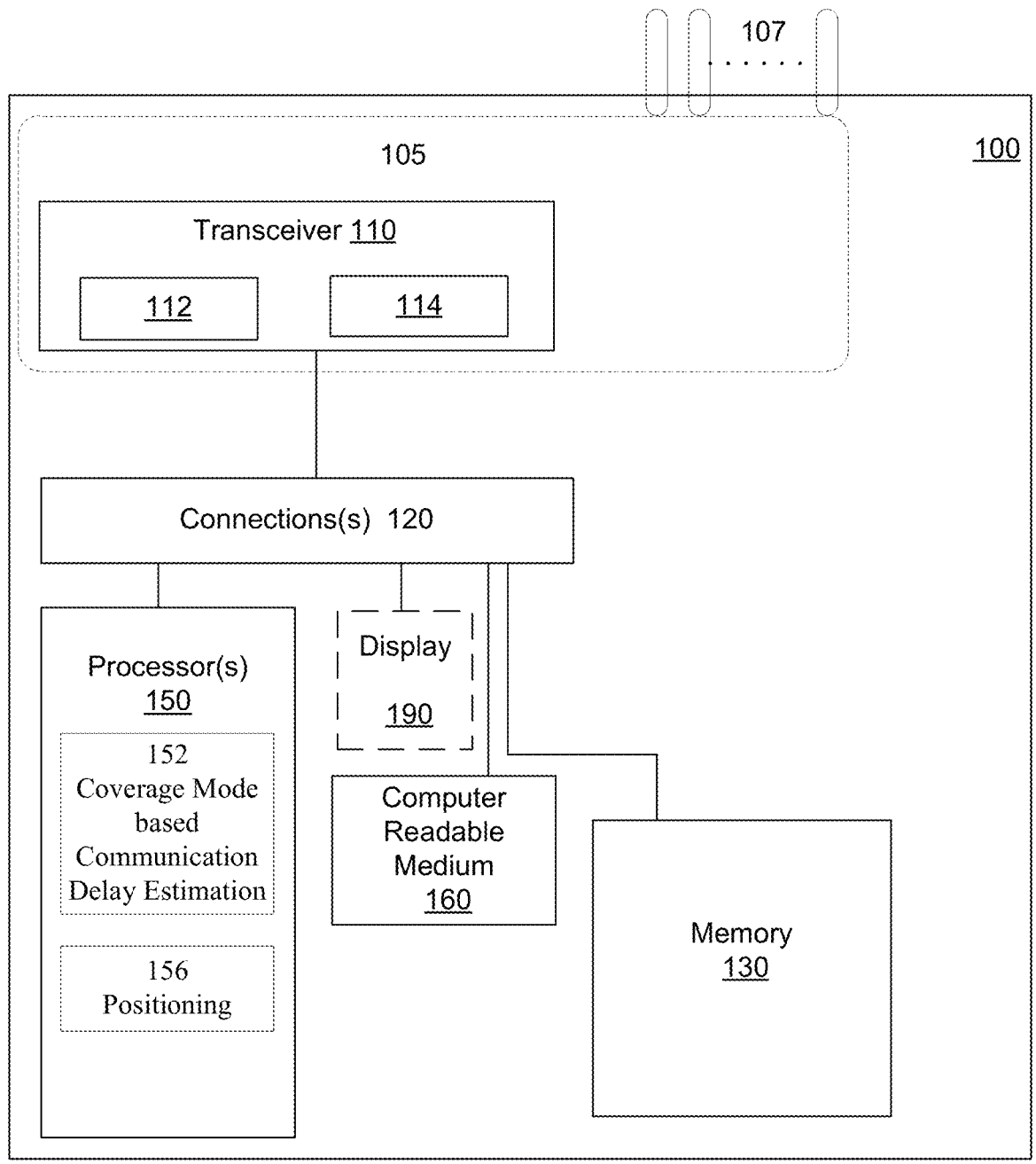
FIG. 1 shows a schematic block diagram illustrating certain exemplary features of a UE enabled to perform wireless communication and location determination functions.

The terms "user equipment" (UE) or "mobile station" (UE), or "target" are used interchangeably herein and may refer to a device such as a cellular or other wireless communication device, including a personal communication system (PCS) device, personal navigation device (PND), Personal Information Manager (PIM), Personal Digital Assistant (PDA), laptop, an Internet of Things (IOT) device, or other suitable mobile device which is capable of receiving wireless communication and/or navigation signals. The terms are also intended to include devices which communicate with a personal navigation device (PND), such as by short-range wireless, infrared, wireline connection, or other connection—regardless of whether assistance data reception, and/or position-related processing occurs at the device or at the PND. The term "communicate," "communicating," or "communication" as used herein refers to sending/transmission, reception, or relaying of signals by an entity; or some combination of sending/transmission, reception, or relaying. The term "location" (also referred to as a "position") as used herein may refer to a geodetic location that may comprise coordinates (e.g. latitude, longitude, and possibly altitude) and optionally an expected error or uncertainty for the location. A geodetic location may be absolute (e.g. comprise a latitude and longitude) or may be relative to some other known absolute location. A location may also be civic and comprise a place name, street address or other verbal description or definition.

In Observed Time Difference of Arrival (OTDOA) based positioning, the UE may measure time differences in received signals from a plurality of sources (e.g. BS' such as eNBs or Transmission Points (TPs)). Because positions of the BS'/TPs can be known, the observed time differences may be used to calculate the location of the UE. OTDOA refers to the time interval that is observed by a UE between the reception of DL signals from two different sources. If a signal from source A is received at a time t_A and the signal from source B is received at t_B, the OTDOA may be determined as the difference (t_B–t_A). UE measurements for OTDOA based positioning may use Reference Signal Time Difference (RSTD) measurement.

Positioning Reference Signals (PRS) are often provided by a BS in order to facilitate OTDOA positioning. The measured time difference of arrival of the PRS from a reference source (e.g. the serving cell or another reference cell) and one or more neighboring sources (e.g. neighbor cells) is known as the Reference Signal Time Difference (RSTD). The RSTD for a source "i" relative to a reference source "Ref", may be given as $(TOA_i - TOA_{Ref})$, where $TOA_i$ is the time of arrival of a reference signal (e.g. PRS or other synchronization signals) from source i and $TOA_{Ref}$ is the time of arrival of a reference signal (e.g. PRS or other synchronization signals) from the reference source. Using the RSTD measurements, the absolute or relative transmission timing of each cell, and the known position(s) of BS physical transmitting antennas for the reference and neighboring cells, the UE's position may be calculated. The reference source may be selected by the UE. The UE may receive OTDOA assistance data to facilitate positioning. The term "intra-frequency RSTD measurement" refers to measurement instances where both the reference source and neighboring source are on the same carrier frequency band as the UE serving cell. The term "inter-frequency RSTD measurement" refers to measurement instances where at least one of the reference source or neighboring source is on a different carrier frequency band from the UE serving cell.

In some instances, for example, when a UE moves to an area with wireless signal attenuation, the UE's coverage mode may be changed. For example, based on the signal quality reported by the UE, the BS (e.g. an evolved Node B) may request that the UE operate in an EC mode. The signal quality may be reported periodically by the UE so that when signal conditions improve, the BS may request the UE to switch back to NC mode. As another example, a UE connected to a BS may move out of a NC region with strong signals into an EC region where signal strength may be lower. To maintain communication session continuity and/or reliability, the UE may be reconfigured to EC mode from NC mode when the reported signal quality deteriorates beyond some threshold. Upon moving back into a region with better signal quality, the UE may be switched back to NC mode.

The Long Term Evolution (LTE) standard specifies a plurality of EC modes (e.g. EC Mode A—for moderate coverage; and EC Mode B—for deep coverage). In EC mode, repetitions of some messages may be used to facilitate increased coverage. The number of repetitions in EC mode can be significant (e.g. in the hundreds) and may have an impact on effective message communication delay. Thus, in EC mode, positioning related messages such as those related to RSTD measurements by the UE may be received at a Position Determination Entity (PDE) such as a Location Server (LS) later than some positioning measurement session timeout period thereby detrimentally affecting UE location determination. For example, a server may disregard or reject a measurement report received after the positioning measurement session timeout period as measured from the start of a positioning measurement session.

Therefore, methods to provide and improve location related services to UEs are desirable. Accordingly, some disclosed embodiments facilitate communication of measurement reports based on a UE coverage mode (a current coverage mode and/or a requested coverage mode) so that the measurement reports are received by network entities prior to measurement timeout times. Timely communication of measurement reports can facilitate seamless positioning during coverage mode transitions. Some disclosed embodiments also facilitate longer measurement periods (e.g. when transitioning from EC to NC mode) thereby potentially increasing positioning accuracy.

In some embodiments, a UE may receive a coverage mode transition request at a first time (t1). When the coverage mode transition request includes a request to transition to EC mode, the UE may determine an expected communication delay ($T_{CE-X}$) for transmission of a RSTD measurement report based on one or more parameters (e.g. a number of message repetitions, number of uplink subframes per frame etc.) in the coverage mode transition request. In some embodiments, the UE may then initiate transmission of the RSTD measurement report at a second time (t2) no later than some specified RSTD measurement time. The specified RSTD measurement time period ($T_S$) refers to the maximum specified time period (as measured from the start time (t) of a positioning measurement session) for a UE to perform RSTD measurements and may be defined in a relevant standard, specified by a BS and/or LS, and/or determined by negotiation between the UE and a network entity. Thus, in the embodiment above, the UE may initiate transmission of the RSTD measurement report at time $t2 \leq t+T_S$.

In some embodiments, the second time (t2) may precede an RSTD measurement timeout time by at least the expected communication delay ($T_{CE-X}$). The RSTD measurement timeout time period ($T_M$) pertains to the maximum time (as measured from the start time (t) of a positioning measurement session) for an RSTD measurement report to be received by a PDE and may be defined in a relevant standard, specified by a BS and/or LS, and/or determined by negotiation between the UE and a network entity. Thus, in the embodiment above, the UE may initiate transmission of the RSTD measurement report at time $t2 \leq t+(T_M-T_{CE-X})$.

In instances where the first time (t1) does not precede the RSTD measurement timeout time by at least the expected communication delay ($T_{CE-X}$) so that $t1 > t+T_M-T_{CE-X}$, then, the transmission of the RSTD measurement report may be initiated upon determination of the expected communication delay ($T_{CE-X}$), or upon reception of the coverage mode transition request. Thus, in the embodiment above, the UE may initiate transmission of the RSTD measurement report at time t2, where $t+t1 \leq t2 \leq t+T_S$. In some embodiments, the UE may transition to the EC mode; and initiate transmission of the RSTD measurement report at the second time (t2) subsequent to the transition to the EC mode.

OTDOA measurements by a UE may be performed based on OTDOA assistance data received by the UE, which may include information related to PRS transmissions by one or more neighboring cells. When a UE switches from NC mode to EC mode, the UEs bandwidth may be reduced to 6 Resource Blocks (RBs) scheduled by the network. However, one or more neighboring cells included in the OTDOA assistance data may operate in the wider NC mode frequency band. Therefore, upon transitioning to EC mode, the UE may request and use measurement gaps even for infra-frequency RSTD measurements of neighboring cells, which may delay measurement reporting. In addition, because of constraints (e.g. number of measurement gaps that can be requested) on measurement gaps, the number of such neighboring cells that may be measured during a positioning measurement session can be limited thereby detrimentally affecting positioning accuracy. Therefore, some disclosed embodiments, also facilitate robust OTDOA measurements while decreasing the use of measurement gaps.

In some embodiments, upon receipt of the coverage mode transition request to EC mode, the UE may maintain a bandwidth associated with the Normal Coverage (NC) mode for measurements during the positioning measurement session, where the bandwidth associated with the NC mode encapsulates a bandwidth associated with the EC mode. The UE may then transition to the EC mode and initiate transmission of the RSTD measurement report at the second time (t2). The second time (t2) may be no later than some specified RSTD measurement time, which may be expressed as $t2 \leq t+T_S$. In some embodiments, the second time (t2) may precede an RSTD measurement timeout time by at least the expected communication delay ($T_{CE-X}$), which may be expressed as $t2 \leq t+(T_M-T_{CE-X})$.

Further, in some embodiments, when the coverage mode transition request includes a request to transition to a Normal Coverage (NC) mode, the UE may transition to the NC mode and initiate transmission of the RSTD measurement report at a third time (t3), wherein the third time (t3) does not exceed the specified RSTD measurement time which may be expressed as $t3 \leq t+T_S$. For example, the UE may initiate transmission of the RSTD measurement report no later than the end of the specified RSTD measurement time subsequent to the transition to the NC mode.

In some embodiments, a BS may determine, based on information related to a transition to an enhanced coverage (EC) mode for a UE communicatively coupled to the BS, an expected communication delay ($T_{CE-X}$) for transmission of an Reference Signal Time Difference (RSTD) measurement report by the UE in the EC mode. Further, the BS may communicate the expected communication delay ($T_{CE-X}$) to a Location Server (LS). In some embodiments, the expected communication delay ($T_{CE-X}$) may be communicated to the LS using a Long Term Evolution Positioning Protocol Annex (LPPa) protocol. In some embodiments, a LS may receive, from a BS, information related to a transition to an enhanced coverage (EC) mode for a User Equipment (UE) communicatively coupled to the BS, wherein the information related to the transition to the EC mode comprises an expected communication delay ($T_{CE-X}$) for transmission of an Reference Signal Time Difference (RSTD) measurement report by the UE in the EC mode. In some embodiments, the LS may comprise an Evolved Serving Mobile Location Center (E-SMLC); and the BS may comprise an Evolved Node B (eNB).

FIG. 1 shows a schematic block diagram illustrating certain exemplary features of a UE 100 enabled to perform wireless communication and location determination functions. In some embodiments, UE 100 may take the form of a mobile device, wearable user device, such as a wristwatch, spectacles, etc., where one or more components of UE 100 may be physically separate but operationally coupled to other functional components. For example, display 190 or another component may be physically separate but operationally coupled processor(s) 150 and/or other functional units in UE 100. UE 100 may be capable of operating in one or more "coverage modes" defined in 3GPP standards (e.g. 3GPP Release 13 and/or 3GPP Release 14) documents, which are a set of standards available from an organization termed the $3^{rd}$ Generation Partnership Project (3GPP). The term "coverage mode" refers to various modes of operation of UE, which may be related to wireless signal or other signal environment conditions. For example, UE 100 may operate or switch to operate in a NC mode, when connected to in a Radio Resource Control (RRC) connected state when signaling conditions are satisfactory. UE 100 may also operate or switch to operate in an EC mode (e.g. EC Mode A or EC Mode B) under more challenging signaling conditions. For example, UE 100 may operate in NC mode when the received signal strength is above some threshold and/or when instructed to by a BS, and may operate in an EC mode when signal strength is below some threshold (e.g. when deep indoors) and/or when instructed to by a BS. In EC mode, a UE may be configured to transmit some messages with repetitions to increase the likelihood of message reception (e.g. by the BS). EC mode may be used to extend the range of a cell and/or improve signal penetration into areas (e.g. buildings or deep indoor environments) which may experience signal attenuation or other signal related constraints.

UE 100 may include one or more processor(s) 150 and memory 130. UE 100 may also include a wireless network interface 105. In some embodiments, wireless network interface 105 may include transceiver 110, which may include transmitter 112 and receiver 114. In some embodiments, UE 100 may further comprise computer-readable medium 160 and display 190. The components above may be operatively coupled to each other with one or more connections 120 (e.g., buses, lines, fibers, links, etc.). In certain example implementations, all or part of UE 100 may take the form of a chipset, and/or the like. Further, UE 100 may optionally include a screen or display 190 capable of rendering images of various types.

In some embodiments, processor(s) 150 may receive input from transceiver 110, which may receive wireless signals through one or more antennas 107, which may be used for signal transmission and reception. In some embodiments, wireless communications interface 105 may comprise transceiver 110. Further, transceiver 110 may, for example, include a transmitter 112 enabled to transmit one or more wireless signals over one or more types of wireless communication networks and a receiver 114 to receive one or more signals transmitted over one or more types of wireless communication networks. For example, transceiver 110 may be capable of communication with a Wireless Local Area Network (WLAN), which may be based on IEEE 802.11 standards, Wireless Personal Area Network (WPAN), which may be based on IEEE 802.15 standards and/or a Wide Area Network (WAN) based on one or more cellular communication standards. In some embodiments, antennas 107, processor(s) 150, and/or UE 100 may be enabled to communicate and process Multiple Input Multiple Output (MIMO) radio streams and/or Multi-User MIMO radio streams.

Processor(s) 150 may be implemented using a combination of hardware, firmware, and software. In some embodiments, processor(s) 150 may perform position determination and/or location assistance functions based on information derived from independent wireless measurements (e.g. RSTD measurements from received wireless signals) by UE 100. In some embodiments, the wireless measurements may be facilitated, in part, by assistance data (e.g. OTDOA assistance data) received by UE 100. In some embodiments, processor(s) 150 may include transceiver 110, and/or other components as part of a single chip, integrated circuit, or package.

Processor(s) 150 may use some or all of the received signals and/or information to determine the location of UE 100. The determined location may be relative (e.g. relative to the position of UE 100) or absolute (e.g. coordinates such as latitude, longitude, and altitude) or civic (e.g. geographic name/location). For example, UE 100/processor(s) 150 may use various methods for determining a position of UE 100 including OTDOA, RSTD, Time Difference of Arrival (TDOA), Round Trip Time (RTT), Fine Timing Measurement (FTM), Advanced Forward Link Trilateralation (AFLT), Received Signal Strength Indication (RSSI), and/or some combination of the above to determine or validate its location.

In some embodiments, UE 100 may measure time differences in received signals from a plurality of BS'. Because positions of the BS' can be known, the observed time differences may be used to calculate the location of the terminal. To further help location determination, Positioning Reference Signals (PRS) are often provided by a BS in order to improve positioning performance. The measured time difference of arrival of the PRS from a reference cell (e.g. the serving cell) and one or more neighboring cells is known as the Reference Signal Time Difference (RSTD). Using the RSTD measurements for two or more neighbor cells, the absolute or relative transmission timing of each cell, and the known position(s) of BS physical transmitting antennas for the reference and neighboring cells, the position of UE 100 may be calculated. The Reference Signal Time Difference (RSTD) for a cell "i" relative to a reference cell "Ref", may be given as $(TOA_i - TOA_{Ref})$, where $TOA_i$ is the time of arrival of a reference signal (e.g. PRS or other synchronization signals) from cell i and $TOA_{Ref}$ is the time of arrival of a reference signal (e.g. PRS or other synchronization signals) from the reference cell. Based on RSTD measurements from two or more BS' (e.g. evolved Node Bs or eNodeBs—hereinafter referred to as "eNBs"), the location of a UE may be determined (e.g. using multi-lateration).

The RSTD measurements may be obtained by UE 100 during a positioning measurement session. The term "measurement session" or "positioning measurement session" is used to refer to a time period during which a UE measures and reports RSTD parameters, which may be used to determine a location of UE 100. A positioning measurement session may include an OTDOA session, and or some specified or predetermined time window. For example, a specified measurement time period ($T_S$) may be available for measurement, as measured from the start the positioning measurement session. The specified measurement time period $T_S$ may be specified by one of: a protocol and/or a standard (e.g. Long Term Evolution (LTE)/LTE Positioning Protocol (LPP)/LPP Extensions (LPPe), etc.) used by one or more of the UE/BS/network; and/or by an entity requesting the measurements (e.g. a location server or other network entity); and/or by communication/negotiation between the UE 100 and an entity requesting measurements and/or involved in the location determination. In addition, a maximum message latency or maximum communication delay for communication of a measurement report may be specified. The maximum communication delay or maximum message latency ($T_D$) may include a propagation delay associated with transmission of the measurement report. The measurement timeout period ($T_M = T_S + T_D$), as measured from the start of a positioning measurement session, may thus be the sum of the time available for the positioning measurement session ($T_S$) and the maximum communication delay ($T_D$). Thus, from a time t representing the start of a positioning measurement session, a measurement report may be received or expected to be received (e.g. by an LS) by a measurement timeout time $t+T_M$.

In some embodiments, processor(s) 150 may include one or more of Coverage Mode based Communication Delay Estimation Engine (CM-CDE) 152 and/or UE Positioning Engine (PE) 156. CM-CDE 152 may provide functionality to estimate a communication delay based on parameters associated with a current or subsequent UE coverage mode. For example, CM-CDE 152 may provide functionality to estimate a communication delay based on the number of repetitions and the number of uplink (UL) sub-frames per frame. The term "uplink" (UL) refers to communications from UE 100 to a BS (e.g. eNB), while the term "downlink" (DL) refers to communication from the BS to UE 100. As one example, if UE is configured to operation in an EC mode with 512 repetitions and 2 UL sub-frames per frame, with a frame duration of 10 milliseconds (ms), then CM-CDE 152 may estimate an expected communication delay ($T_{CE-X}$) for the currently configured EC mode as $$T_{CE-X} = \frac{512 \text{ repetitions}}{2UL \text{ sub-frames per frame}} * (\text{frame duration}) =$$

$$256 \text{ frames} * 10 \text{ ms} = 2560 \text{ ms}.$$

In some embodiments, the expected communication delay ($T_{CE-X}$) (e.g. as determined by CM-CDE 152) may be used along with the coverage mode (current or an immediately subsequent coverage mode) to determine a time of transmission of a measurement report by UE 100. In some embodiments, CM-CDE 152 may provide the expected communication delay ($T_{CE-X}$) to PE 156.

In some embodiments, processor(s) 150 may also include a PE 156 to obtain wireless measurements (e.g. OTDOA measurements/RSTD values) and/or determine the location of the UE 100 based, in part, on information (e.g. RSTD values), which may be obtained during the positioning session. Processor(s) 150 and/or PE 156 may use information obtained by CM-CDE 152 such as the expected communication delay ($T_{CE-X}$) and the coverage mode to determine when to: (i) stop measurements for a positioning measurement session; and/or (b) transmit a measurement report reflecting measurements obtained during the positioning measurement session. In some embodiments, UE 100 may receive location assistance information including OTDOA assistance information (such as information related to neighbor cells, PRS transmissions of neighboring cells, etc.) from a network entity such as an LS (e.g. E-SMLC) and/or a server communicatively coupled to the UE. The OTDOA assistance data may be used by processor(s) 150 and/or PE 156 to perform RSTD measurements and/or determine a location of UE 100. In some embodiments, UE 100 and/or processor(s) 150 may initiate a location determination method to determine a location of the UE.

In some embodiments, UE 100 and/or processor(s) 150 may periodically report measured signal strengths (e.g. average signal strengths/RSSI over some preceding time period). In some embodiments, based on the reported signal strengths, UE 100 may receive instructions to transition from one coverage mode (e.g. NC mode) to another coverage mode (e.g. EC mode).

The elements and methodologies described herein may be implemented by various means depending upon the application. For example, these elements and methodologies may be implemented in hardware, firmware, software, or any combination thereof. For example, for a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code, which may be stored in a computer-readable medium 160 and/or memory 130, may be read and executed by processor(s) 150 and may contain instructions for execution by the processor to perform any of the functionality described with reference to FIGS. 5A-5B, 6A-6B, and 9.

Memory 130 may be implemented within processor(s) 150 or external to processor(s) 150. As used herein, the term "memory" refers to any type of long term, short term, volatile, nonvolatile, or other memory and is not to be limited to any particular type of memory or number of memories, or type of media upon which memory is stored. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within, or otherwise co-located with and/or coupled to, processor(s) 150. If implemented in firmware and/or software, the functions may be stored as one or more instructions or program code on a computer-readable medium, such as medium 160 and/or secondary memory. Examples include computer-readable media encoded with computer programs and data associated with or used by the program.

Computer-readable medium 160 includes physical computer storage media, which may be accessed by a computer and/or processor(s) 150. In some embodiments, computer-readable medium 160 may include various types of memory 130 that may be read and/or accessed by UE 100 and/or processor(s) 150. By way of example, and not limitation, such computer-readable media can comprise one or more of the following: Random Access Memory (RAM), Read Only Memory (ROM), Programmable ROM (PROM), Electrically Erasable PROM (EEPROM), Non-Volatile Random Access Memory (NVRAM), flash memory, Compact Disc ROM (CD-ROM), or other optical disk storage, magnetic disk storage or other magnetic storage devices, or any other medium that can be used to store desired program code in the form of instructions and/or data and that can be accessed by a computer. The terms "disk" and "disc," as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. In some embodiments, computer-readable medium 160 may include instructions for execution by the processor comprising instructions to perform any of the functionality described with reference to FIGS. 5A-5B, 6A-6B, and 9.

For example, the computer-readable medium including program code stored thereon may include program code to support wireless communication including assistance data reception, position determination, wireless signal measurements, etc. in accordance with certain embodiments presented herein. For example, the code may support one or more of AFLT/RTT/RSSI/RSTD/OTDOA, and other location determination techniques. In some embodiments, the program code may further support coverage mode transitions. In some embodiments, the program code may determine an expected communication delay ($T_{CE-X}$) based on a current and/or immediately subsequent coverage mode and determine a time of transmission for measurement reports based on the expected communication delay ($T_{CE-X}$). The computer-readable medium 160 including program code stored thereon may include program code to support wireless communication (including unicast, multicast, and broadcast), and/or wireless measurement, positioning, (including in a MIMO/MU-MIMO) environment in accordance with certain embodiments presented herein.

In some embodiments, instructions and/or data may be provided over a communication channel. For example, a communication apparatus may include a transceiver 110, which may receive signals through receiver 114 indicative of instructions and data. The instructions and data may cause one or more processors to implement wireless communication and/or positioning related methods (e.g. ranging and/or position determination). The instructions and data may also cause one or more processors to implement functions outlined herein.

Figure 2A:
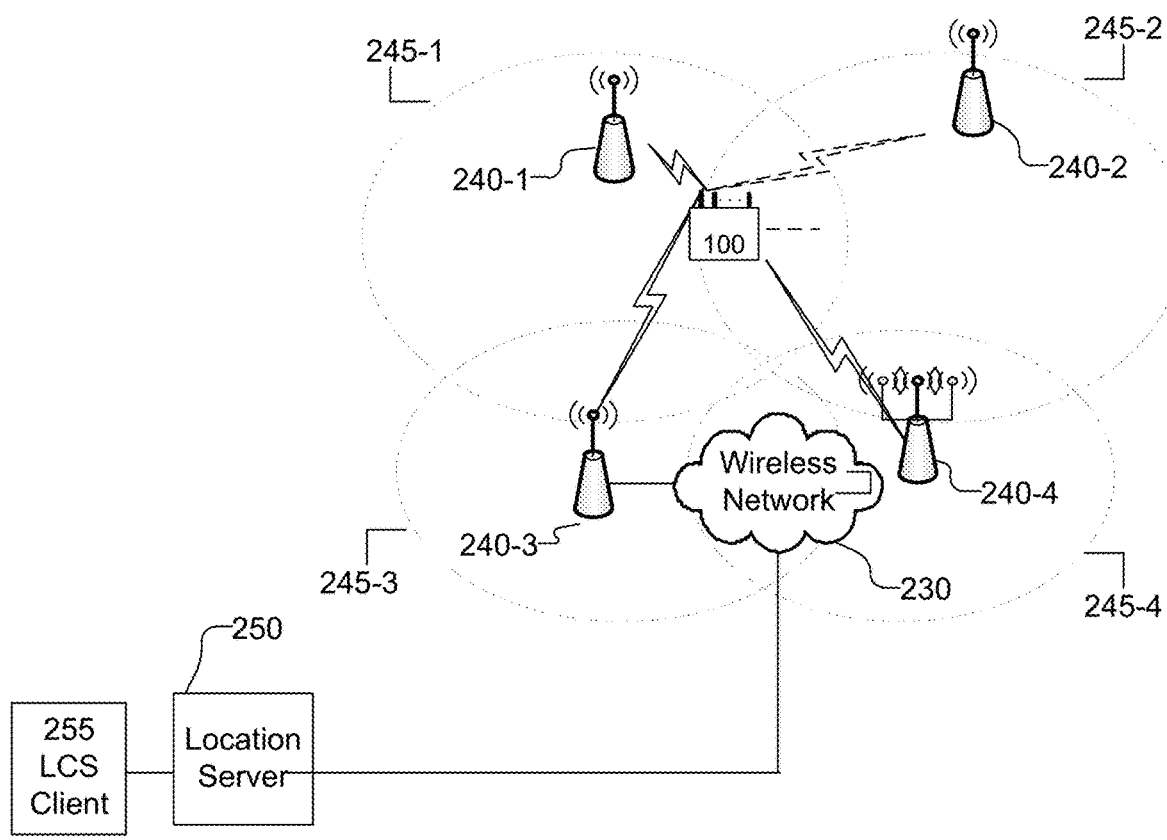
FIG. 2A shows a system capable of providing Location Services to UE 100 including the transfer of location assistance data or location information.

FIG. 2A shows a system 200 capable of providing Location Services to UE 100 including the transfer of location assistance data or location information. In FIG. 2A, one or more of the blocks shown may correspond to logical entities. The logical entities and block shown in FIG. 2A are merely exemplary. The logical entities shown in FIG. 2A may be physically separate, or, one or more of the logical entities may be included in a single physical server or device. Further, the functions associated with the logical entities/blocks may be split or combined in various ways in a manner consistent with disclosed embodiments.

Referring to FIG. 2A, system 200 may support the transfer of location assistance data or location information, using messages such as Long Term Evolution (LTE) Positioning Protocol (LPP) or LPP extensions (LPPe) messages between UE 100 and location server (LS) 250, which may take the form of an Enhanced Serving Mobile Location Center (E-SMLC) or another network entity. The transfer of the location information may occur at a rate appropriate to both UE 100 and LS 250 or other entity. Further, the LPP Annex (LPPa) protocol may be used for communication between LS 250 (which may comprise an E-SMLC) and BS 240 (which may comprise an eNB or Home eNB).

LPP is well-known and described in various publicly available 3GPP technical specifications (e.g., 3GPP Technical Specification (TS) 36.355 entitled "LTE Positioning Protocol"). In some embodiments, system 200 may form part of, comprise, or contain an Evolved Packet System (EPS), which may comprise an evolved UMTS Terrestrial Radio Access Network (E-UTRAN) and an Evolved Packet Core (EPC). LPPe has been defined by the Open Mobile Alliance (OMA) (e.g. in OMA TS OMA-TS-LPPe-V1_0 entitled "LPP Extensions Specification") and may be used in combination with LPP such that each combined LPP/LPPe message would be an LPP message comprising an embedded LPPe message. LPPa is described in the publicly available 3GPP TS 36.455 document entitled "LTE Positioning Protocol A." In general, a positioning protocol such as LPP and LPPe may be used to coordinate and control position determination. The positioning protocol may define: (a) positioning related procedures that may be executed by LS 250 and/or a UE 100; and/or (b) communication or signaling related to positioning between LS 250 and UE 100. In the case of LPPa, the protocol may be used between LS 250 and BS 240 (e.g. an eNB) to enable LS 250 to request and receive configuration information related UEs 100, BS 240 (e.g. details of PRS signals transmitted, expected communication delay ($T_{CE-X}$) based on a UE coverage mode, etc.) and positioning measurements made by and/or available to BS 240 related to UE 100.

For simplicity, only one UE 100, four BS' 240-1, 240-2, 240-3 and 240-4 (collectively BS' 240) serving cells 245-1, 245-2, 245-3 and 245-4 (collectively cells 245), respectively, and one Location Server (LS) 250 are shown in FIG. 2A. In general, system 200 may comprise multiple cells indicated by 245-$k$ (0≤k≤$N_{cells}$, where $N_{cells}$ is the number of cells) with additional wireless networks 230, UEs 100, servers 250, and BS' 240. System 100 may further comprise a mix of cells 245 including macrocells along with small cells (e.g. femtocells) in a manner consistent with embodiments disclosed herein.

Further, a cell (e.g. cell 245-1) may comprise multiple Transmission Points (TPs) (not shown in FIG. 2A), which may be controlled by a BS (e.g. one of BS' 240-1, 240-2, 240-3, and/or 240-4). BS' 240 may comprise an eNB or Home eNB. Each TP may broadcast PRS signals for a cell (e.g. cell 245-1). In general, TPs may form part of a Terrestrial Beacon System (TBS) and may comprise a set of geographically co-located transmit antennas for one cell, for a part of one cell, or one or more PRS-only TPs. A BS (such as BS 240-1, which may be an eNB) can include a TP. Further, TPs may include, antennas, remote radio heads (RRHs), remote antennas of a BS, an antenna of a PRS-only TP, etc. A cell (e.g. cell 245-1) can be formed by one or multiple transmission points. TPs may be used to extend cell coverage into challenging signal environments. The term "Terrestrial Beacon System" or "TBS" refers to a network of ground-based transmitters broadcasting signals (e.g. BS' 240-1, 240-1, 240-3, and 240-4) for geo-spatial positioning with wide-area or regional coverage. TBS' may include Metropolitan Beacon Systems (MBS) and/or PRS-based TBS, which may facilitate downlink (e.g. OTDOA) positioning.

UE 100 may be capable of wirelessly communicating with LS 250 through one or more networks 230 that support positioning and location services, which may include, but are not limited to, the Secure User Plane Location (SUPL) location solution defined by OMA and the Control Plane location solution defined by 3GPP for use with an LTE serving network.

In Control Plane (CP) positioning, the signaling used to initiate a positioning event, and the signaling related to the positioning event occur over the control channels of the cellular network. In CP positioning, LS 250 may include or take the form of an Enhanced Serving Mobile Location Center (E-SMLC). In User Plane (UP) positioning such as Secure User Plane Location (SUPL) positioning, signaling to initiate and perform Location Based Services (LBS) functions may utilize user data channels and appear as user data. In UP positioning, LS 250 may include or take the form of a SUPL Location Platform (SLP).

Positioning may be UE-assisted or UE-based. In UE-assisted positioning, UE 100 may perform signal measurements (e.g. RSTD measurements) and send the signal measurements to LS 250, which may determine a location of UE 100 based, in part, on the signal measurements. In UE-based positioning, UE 100 may perform signal measurements, determine a location of UE 100, and send the location estimate to LS 250 (e.g. E-SMLC or SLP).

As an example, Location Services (LCS) may be performed on behalf of an LCS Client 255 that accesses LS 250 and issues a request for the location of UE 100. LS 250 may then respond to LCS Client 255 with a location estimate for UE 100. LCS Client 255 may also be known as a SUPL Agent—e.g. when the location solution used by LS 250 and UE 100 is SUPL. In some embodiments, UE 100 may also include an LCS Client or a SUPL agent (not shown in FIG. 2A) that may issue a location request to some positioning capable function within UE 100 and later receive back a location estimate for UE 100. The LCS Client or SUPL Agent within UE 100 may perform location services for the user of UE 100—e.g. provide navigation directions or identify points of interest within the vicinity of UE 100. In some embodiments, LS 250 may be a SUPL Location Platform (SLP), E-SMLC, a Serving Mobile Location Center (SMLC), a Gateway Mobile Location Center (GMLC), a Position Determining Entity (PDE), a Standalone SMLC (SAS), and/or the like.

As illustrated in FIG. 2A, the UE 100 may communicate with LS 250 through network 230 and BS' 240, which may be associated with wireless network 230. UE 100 may receive and measure signals from BS' 240, which may be used for position determination. For example, UE 100 may receive and measure signals from one or more of BS' 240-1, 240-2, 240-3, and/or 240-4, which may be associated with cells 245-1, 245-2, 245-3, and 245-4, respectively. In some embodiments, BS' 240 may form part of a wireless communication network, which may be a wireless wide area network (WWAN), wireless local area network (WLAN), a wireless personal area network (WPAN), and/or some combination thereof.

A WWAN may be a cellular network such as one with support for 3GPP MTC technologies. A WWAN may include networks based on LTE, LTE-M, and/or variants thereof. LTE-M is based on LTE and incorporates features to support services for UEs including IoT devices and bandwidth limited UEs. LTE-M reuses portions of the LTE physical layer and can be deployed on existing LTE networks by appropriately configuring BS' (e.g. BS 240-1). A LAN may be an Institute of Electrical and Electronics Engineers (IEEE) 802.3x network, for example. A WLAN may be an IEEE 802.11x network. A WPAN may be a Bluetooth network, an IEEE 802.15x, or some other type of network.

In some embodiment, one or more BS' 240 may transmit PRS signals in order to improve OTDOA positioning performance. RSTD is the measured time difference of arrival of the PRS from a reference cell (e.g. the serving cell) and one or more neighboring cells. Using the RSTD measurements, the absolute or relative transmission timing of each cell, and the known position(s) of BS physical transmitting antennas for the reference and neighboring cells, the UE's position may be calculated.

Some positioning techniques for Location Based Services (LBS) that use cellular systems to provide low power and wide area device connectivity (e.g. for IoT devices) were developed by an organization known as the 3rd Generation Partnership Project (3GPP). Specifically, in 3GPP Release 13, physical channels and signals transmitted or received by UE 100 (e.g. enhanced Machine Type Communication—hereinafter "eMTC" UEs) may be contained in a new frequency band termed a "narrowband," which may include a predefined set of six contiguous Resource Blocks. UE 100 may be served by a cell (e.g. cell 245-1 associated with BS 240-1) that has a larger bandwidth so that the narrowband may be contained within a wider system bandwidth in which UE 100 communicates with BS 240-1. The physical channels and signals transmitted or received by UE 100 may be contained in the narrowband with the predefined set of six contiguous Resource Blocks. Further, Release 13 introduced frequency hopping among different narrowbands. In frequency hopping, the same signal is transmitted using different sets of 6 RBs each within the LTE transmission band. Thus, the frequency of the transmitted signal may "hop," for example, at some predetermined intervals. 3GPP Release 14 envisages further enhancements, which enable dense PRS configurations (e.g. increasing the number of consecutive PRS subframes per positioning occasion) and more frequent PRS transmissions (reduced PRS periodicity) to allow improved positioning accuracy for UE 100 (e.g. further enhanced Machine Type Communication—hereinafter "FeMTC" UEs). For example, BS 240-1 (e.g. eNB) may be configured to transmit PRS signals, which may be received by UE 100. In some embodiments, the PRS signals transmitted by BS 240-1 may be compliant with LTE and/or LTE MTC (e.g. LTE Release 13 and/or LTE Release 14) standards. UEs 100 may be enabled to receive one or more of the above signals transmitted by BS' 240.

In some embodiments, the PRS signals transmitted by BS 240-1 may be compliant with LTE Release 9, so that BS 240-1 may transmit PRS with a periodicity of one of: 160, 320, 640, or 1280 subframes where the duration of each positioning occasion may be one of: 1, 2, 4, or 6 subframes. In some embodiments, LS 150 (e.g. E-SMLC) may provide OTDOA assistance information to UE 100, which may facilitate PRS measurement by UE 100. When signals transmitted by eNB 140-1 are compliant with LTE-M (e.g. LTE Release 13 and/or LTE Release 14), PRS may be transmitted with a periodicity of one of: 10, 20, 40, 80, 160, 320, 640, or 1280 subframes, and where the duration of each positioning occasion may be one of: 2, 4, 6, 10, 20, 40, 80, or 160 subframes.

When a UE 100 uses OTDOA based positioning, in some situations, PRS measurement may involve monitoring or tuning (by UE 100) to: different frequencies in the narrowband (intra-frequency), and/or to a different carrier frequency (inter-frequency). For example, the serving cell (e.g. cell 245-1 associated with BS 240-1) may belong to a frequency layer operating at frequency f1, while PRS' or assistance data cells (e.g. cell 245-2 associated with BS 240-2) are deployed on inter-frequency layer operating at frequency f2. As another example, UE 100 may operate in a narrowband in EC mode, and may tune to another carrier frequency in the NC mode frequency band to perform RSTD measurements.

Conventionally, in the above situations, UEs may measure PRS during 6 ms measurement gaps, which occur with a periodicity of 40 ms or 80 ms. The term "measurement gap" refers to periods that the UEs may use to perform measurements. No UL and DL transmissions are scheduled during measurement gaps. In EC mode, the bandwidth of the UE may be reduced to 6 Resource Blocks (RBs) scheduled by the network. However, one or more neighboring cells included in the OTDOA assistance data (e.g. cell 245-2 associated with BS 240-2) may operate in the wider NC mode frequency band. Therefore, conventionally, upon transitioning to EC mode, UEs may request and use measurement gaps even for infra-frequency RSTD measurements of neighboring cells, which may delay measurement reporting. In addition, in conventional situations, because of constraints (e.g. number of measurement gaps that can be requested) on measurement gaps, the number of such neighboring cells that may be measured during a positioning measurement session can be limited thereby detrimentally affecting positioning accuracy.

In some embodiments, upon receipt of a coverage mode transition request to EC mode, UE 100 may maintain a bandwidth associated with the NC mode for measurements during the positioning measurement session, where the bandwidth associated with the NC mode encapsulates a bandwidth associated with the EC mode. UE 100 may then transition to the EC mode and initiate transmission of the RSTD measurement report at an appropriate time (e.g. based, in part, on the expected communication delay ($T_{CE-X}$)).

In some embodiments, UE 100 may receive a coverage mode transition request at a first time (t1); and upon determining that the coverage mode transition request includes a request to transition to an EC mode, determine, based on one or more parameters in the coverage mode transition request, an expected communication delay ($T_{CE-X}$) for transmission of a RSTD measurement report, and initiate transmission of the RSTD measurement report at a second time (t2) no later than a specified RSTD measurement time (t+$T_S$), which may be expressed as t2≤t+$T_S$, where t is the start time of the positioning measurement session and $T_S$ represents the specified measurement time period. In some embodiments, the second time (t2) may precede a positioning measurement session timeout time (t+$T_M$) by at least the expected communication delay ($T_{CE-X}$), which may be expressed as t2≤t+ ($T_M$-$T_{CE-X}$).

Figure 2B:
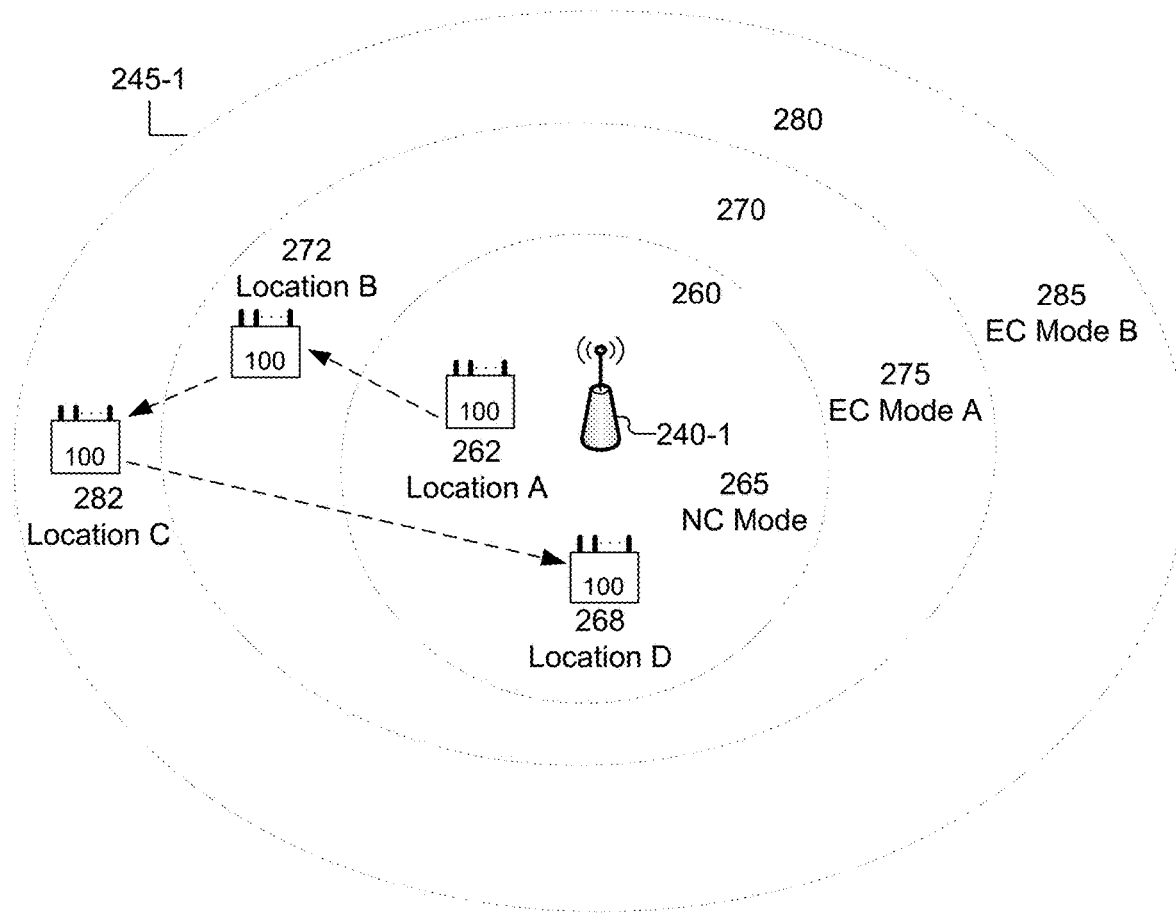
FIG. 2B shows coverage mode transitions for UE moving within cell.

FIG. 2B shows coverage mode transitions for UE 100 moving within cell 245-1. As shown in FIG. 2B, at location A 262, UE 100 may be connected to BS 240-1 in strong signal environment 260 with Reference Signal Received Quality (RSRQ) above some first threshold. At location A 262, UE 100 may be initially configured in NC mode 265. Subsequently, UE 100 may move to Location B 272 in moderate signal environment 270 where signals from BS 240-1 may be attenuated with RSRQ below the first threshold but above some second threshold. Based on the reported RSRQ, UE 100 may be configured in EC Mode A 275. UE 100 may then move to Location C 282 in weak signal environment 280 where signals from BS 240-1 may be further attenuated with RSRQ below the second threshold. Based on the reported RSRQ, UE 100 may be configured in EC Mode B 285. When UE subsequently moves to Location D 268 in strong signal environment 260, UE 100 may be reconfigured to NC mode based on the reported RSRQ. Typically, EC mode A 275 may involve a lower number of message repetitions relative to EC mode B 285.

In some embodiments, UE 100 may be configured to be in NC Mode 265, EC Mode A 275, or EC Mode B 285 via a Radio Resource Control (RRC) Message. The RRC protocol pertains to control plane signaling between UE 100 and a BS 240. RRC messages may be used, for example, to: broadcast system information, configure measurement and reporting, establish and/or release an RRC connection, configure security, transfer radio access capabilities of UE 100, configure radio resources, etc. In order to operate in the newly configured mode, UE 100 may use stored and received system information. For example, UE 100 may use information in Master Information Block (MIB) and/or System Information Blocks (SIBs) to facilitate the transition to the newly configured mode. Separate instances of SIB1 and SIB2 are used for NC mode and EC mode A/B. Therefore, prior to transitioning to the newly configured mode, UE 100 may obtain SIB1 and SIB2 for the newly configured mode. In some embodiments, SIB1 and SIB2 information for the newly configured mode may be provided in RadioResourceConfigCommon Information Element (IE) and/or in a MobilityControlInformation IE. For example, one or more of the parameters: fdd-DownlinkOrTddSubframeBitmapBR, fdd-DownlinkOrTddSubframeBitmapBR, fdd-UplinkSubframeBitmapBR, startSymbolBR, and/or other parameters may be used to signal configuration information for the newly configured mode to UE 100. In some embodiments, the configuration information may include the number of repetitions, the number of subframes, the hopping pattern of the 6 RBs, UL-DL SF configuration for half duplex etc. In some embodiments, the configuration information exchanged between UE 100 and BS 140 (e.g. eNB) may further include and/or be modified to include additional IEs such an expected communication delay ($T_{CE-X}$). In some embodiments, the expected communication delay ($T_{CE-X}$) may be determined by UE 100 based on configuration parameters (stored and/or received) for the newly configured mode.

Figure 3:
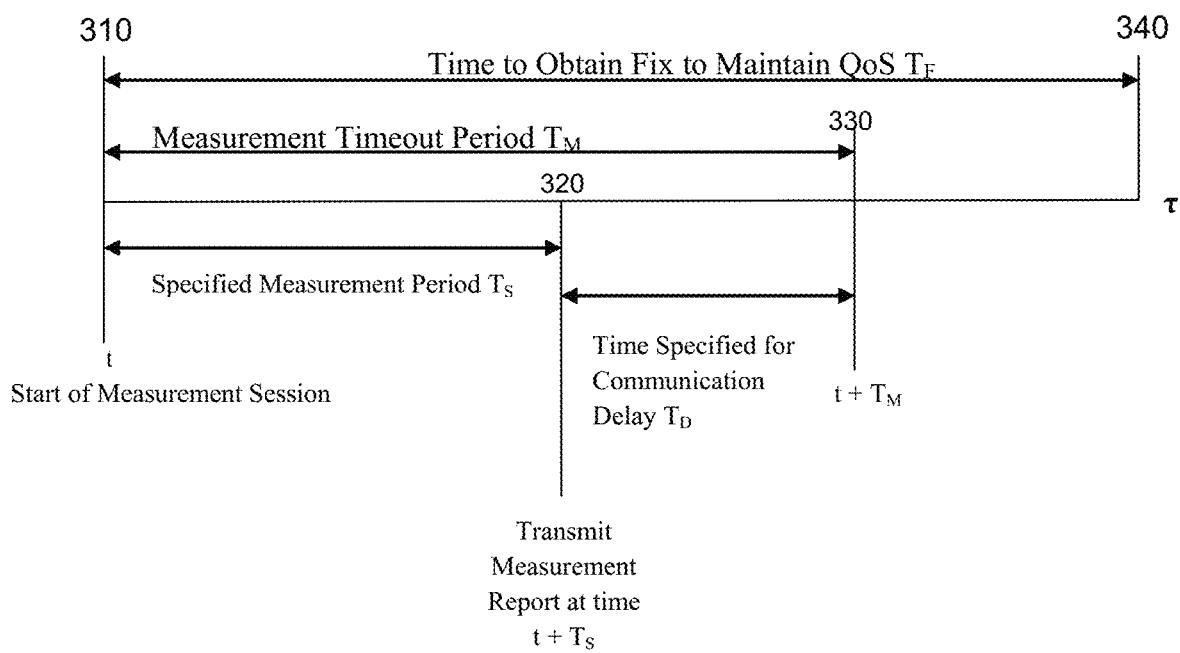
FIG. 3 shows a timeline indicating event durations for events that may occur during a positioning measurement session.

FIG. 3 shows a timeline τ indicating event durations for events that may occur during a positioning measurement session. FIG. 3 is not drawn to scale and shows example events to facilitate description. As shown in FIG. 3, the positioning measurement session may start at a start time t 310. The measurement timeout period for the positioning measurement session ($T_M$) may be the sum of the specified measurement period ($T_S$) and a time specified for communication delay ($T_D$). Thus, $T_M$=$T_S$+$T_D$. The measurement timeout time 330 may thus be written as (t+$T_M$). When UE 100 transmits a measurement report including OTDOA/RSTD measurements by time (t+$T_S$) 320 in NC mode, the measurement report is typically received by a LS 250 (e.g. E-SMLC) prior to measurement timeout time (t+$T_M$). LS 250 (e.g. E-SMLC), may then determine a position of UE 100 based, in part, on the RSTD measurements by a time to obtain a position fix ($T_F$) 340 so that Quality of Service (QoS) parameters can be maintained.

However, in EC mode, UE may be configured with a number of message repetitions. Thus, in view of the number of message repetitions (which may be several hundred) the specified communication delay ($T_D$) may not correctly reflect the actual or real-world communication delay. Thus, conventionally, in EC mode, even when the measurement report is transmitted by time (t+$T_S$) 320, the report may arrive at LS 250 (e.g. E-SMLC) after measurement timeout time (t+$T_M$) 330, which may cause the report to be rejected or ignored, thereby detrimentally affecting UE position determination.

Figure 4A:
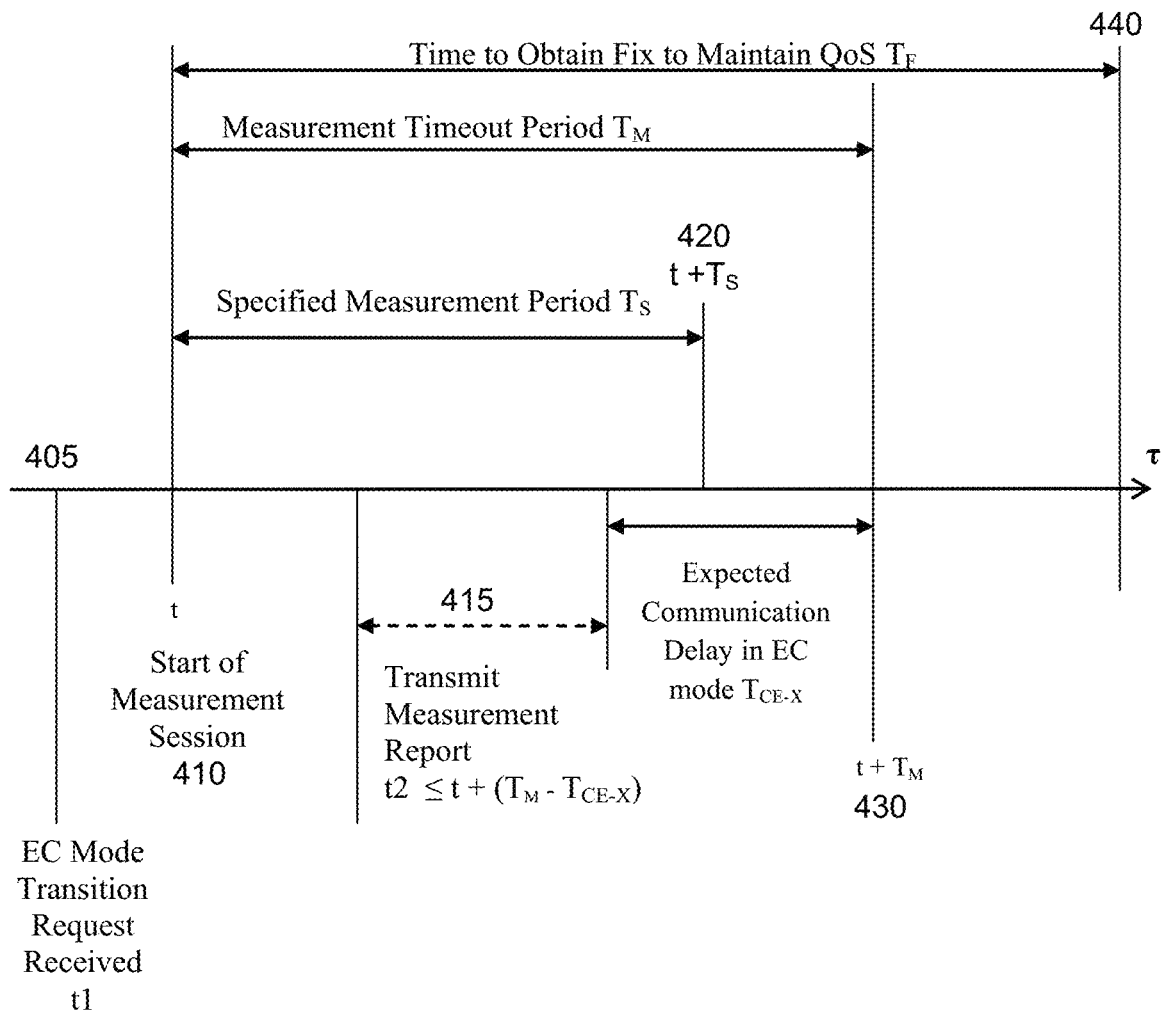
FIG. 4A, FIG. 4B, and FIG. 4C shows timeline indicating event durations for event sequences that may occur during a positioning measurement session in accordance with some disclosed embodiments.
Figure 4B:
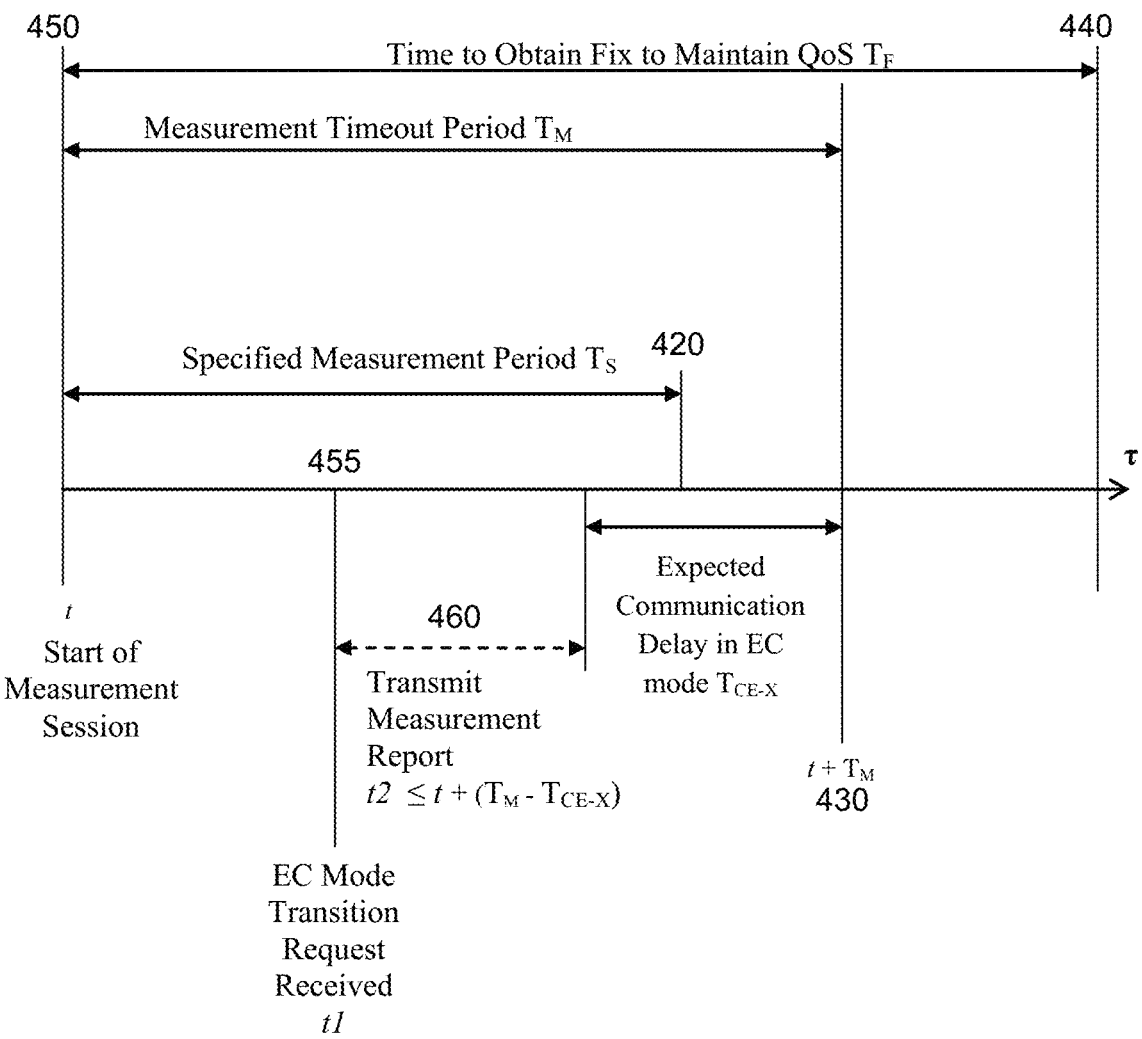
Figure 4C:
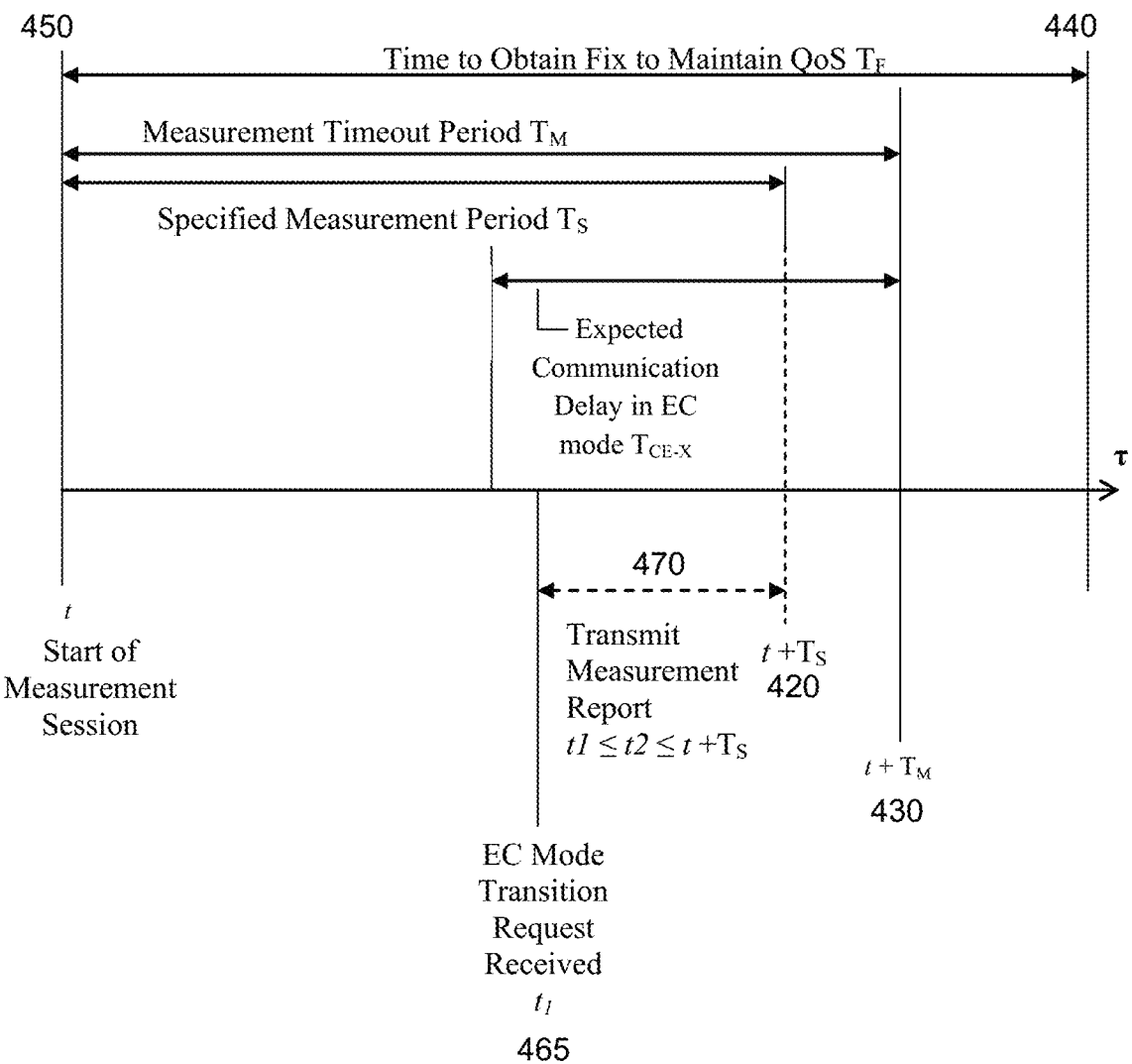

FIG. 4A, FIG. 4B, and FIG. 4C each show a timeline τ indicating event durations for event sequences that may occur during a positioning measurement session in accordance with some disclosed embodiments. FIG. 4A, FIG. 4B, and FIG. 4C are not drawn to scale and are merely examples to facilitate description of disclosed embodiments.

As shown in FIG. 4A, an EC mode transition request may be received at a time t1 405, preceding the start time t 410 of the positioning measurement session. As outlined above, the measurement timeout period for the positioning measurement session ($T_M$) may be the sum of the specified measurement period ($T_S$) and a time specified for communication delay ($T_D$). Thus, $T_M$=$T_S$+$T_D$. The measurement timeout time 430 may thus be written as (t+$T_M$).

In some embodiments, in EC mode, UE 100 may be configured with a number of repetitions. Thus, in view of the number of repetitions (which may be several hundred) the UE may determine an expected communication delay.

For example, if UE is configured to operate in an EC mode with 128 repetitions and 2 UL sub-frames per frame, with a frame duration of 10 ms, then, for the configured EC mode, $TC_{CE-X}$ may be determined as $$T_{CE-X} = \frac{256 \text{ repetitions}}{2 UL \text{ sub-frames per frame}} * (\text{frame duration}) =$$

$$128 \text{ frames} * 10 \text{ ms} = 1280 \text{ ms}.$$

In some embodiments, UE may determine $T_{CE-X}$ based, in part, on the configuration parameters including the number of repetitions, the number of UL sub-frames per frame, etc. As shown in FIG. 4A, in some embodiments, UE 100 may transmit the measurement report at a time t2 415 preceding the measurement timeout time 430 by at least the communication delay. Mathematically, time t2 415 may be written as t2≤(t+$T_M$)−$T_{CE-X}$. Transmitting the measurement report no later than time t2 415, where t2≤(t+$T_M$)−$T_{CE-X}$, increases the likelihood that the measurement report may be received by LS 250 (or another position determination entity (PDE)) prior to the measurement timeout time (t+$T_M$) 430. In some embodiments, as shown in FIG. 4A, the time t2 415 may precede the specified measurement time (t+$T_S$) 420 so that time t2 415 may be expressed as t2<t+$T_S$. In the example above, where $T_{CE-X}$=1280 ms, UE 100 may transmit the measurement report at a time t2 415 given by t2≤t+($T_M$−1280 ms). Upon receipt of the measurement report, LS 250 may determine the position of UE 100 by the time to obtain fix to maintain QoS parameters $T_F$ 440 thereby maintaining QoS.

In FIG. 4B, an EC mode transition request may be received at a time t1 455, at some point after the start time t 450 of the positioning measurement session. In some embodiments, when EC mode transition request is received early enough, then, upon determination of $T_{CE-X}$, UE 100 may transmit the measurement report at a time t2 460 preceding the measurement timeout time (t+$T_M$) 430 by at least the communication delay, so that time t2 460 may be expressed as t2≤t+($T_M$−$T_{CE-X}$). Transmitting the measurement report no later than time t2 460, increases the likelihood that the measurement report may be received by LS 250 (or another position determination entity (PDE)) prior to the measurement timeout time (t+$T_M$) 430. In some embodiments, as shown in FIG. 4B, the time t2 460 may precede the specified measurement time (t+$T_S$) 420 so that time t2 460 may be expressed as t2<t+$T_S$. In the example above, where $T_{CE-X}$=1280 ms, UE 100 may transmit the measurement report at a time t2 given by t2≤t+($T_M$−1280 ms). Upon receipt of the measurement report, LS 250 may determine the position of UE 100 by time to obtain fix to maintain QoS parameters $T_F$ 440 thereby maintaining QoS.

In FIG. 4C, an EC mode transition request may be received at a first time t1 465, after the start time t 450 of the positioning measurement session. However, upon determination of $T_{CE-X}$, UE 100 may determine that the time remaining before measurement timeout time (t+$T_M$) 430 is less than $T_{CE-X}$, which may be expressed as t1>t+$T_M$−$T_{CE-X}$. In the example above, (a) the EC mode transition request may be received with less than 1280 ms remaining until time t+$T_M$ 430. For example, upon determination of $T_{CE-X}$, UE 100 may determine that less than 1280 ms remains until time t+$T_M$ 430.

In some embodiments, as shown in FIG. 4C, UE 100 may transmit the measurement report at time t2 470 upon determination that the time remaining until measurement timeout time 430 is less than $T_{CE-X}$. Thus, time t2 470 may expressed as t1≤t2≤t+$T_S$, where time (t+$T_S$) 420 is the specified measurement time. In some embodiments, upon determination that the time remaining for measurement timeout is less than $T_{CE-X}$, UE 100 may transmit the measurement report at a time t2 470 no later than the specified measurement time (t+$T_S$) 420, so that t1≤t2≤(t+$T_S$).

In some embodiments, UE 100 may transmit the measurement report at time t2 470 upon receipt of the EC mode transition request so that time t2 470 may be expressed as t2=t1. As one example, UE 100 may be configured with a threshold time period $T_{TH}$ for RSTD measurements or determine that a threshold time period $T_{TH}$ has passed from start of the positioning measurement session. If the EC mode transition request is received after a threshold time period $T_{TH}$ has passed from start of the positioning measurement session, UE 100 may transmit the measurement report upon receipt of the EC mode transition request. In some embodiments, the transmission of the measurement report may be triggered by receipt of the EC mode transition request.

Figure 5A:
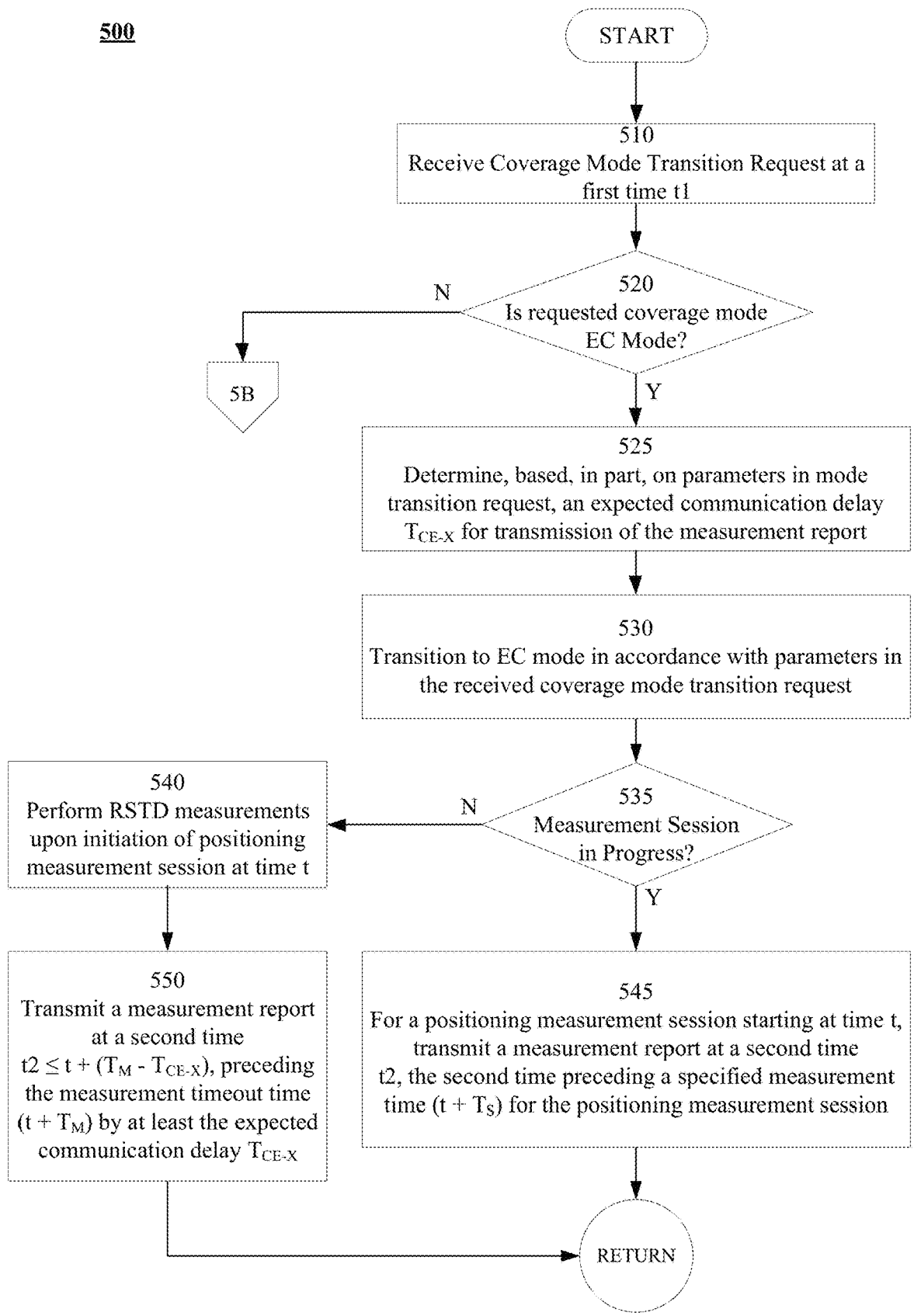
FIG. 5A and FIG. 5B show a flowchart for an exemplary method 500 of position determination in accordance with disclosed embodiments.
Figure 5B:
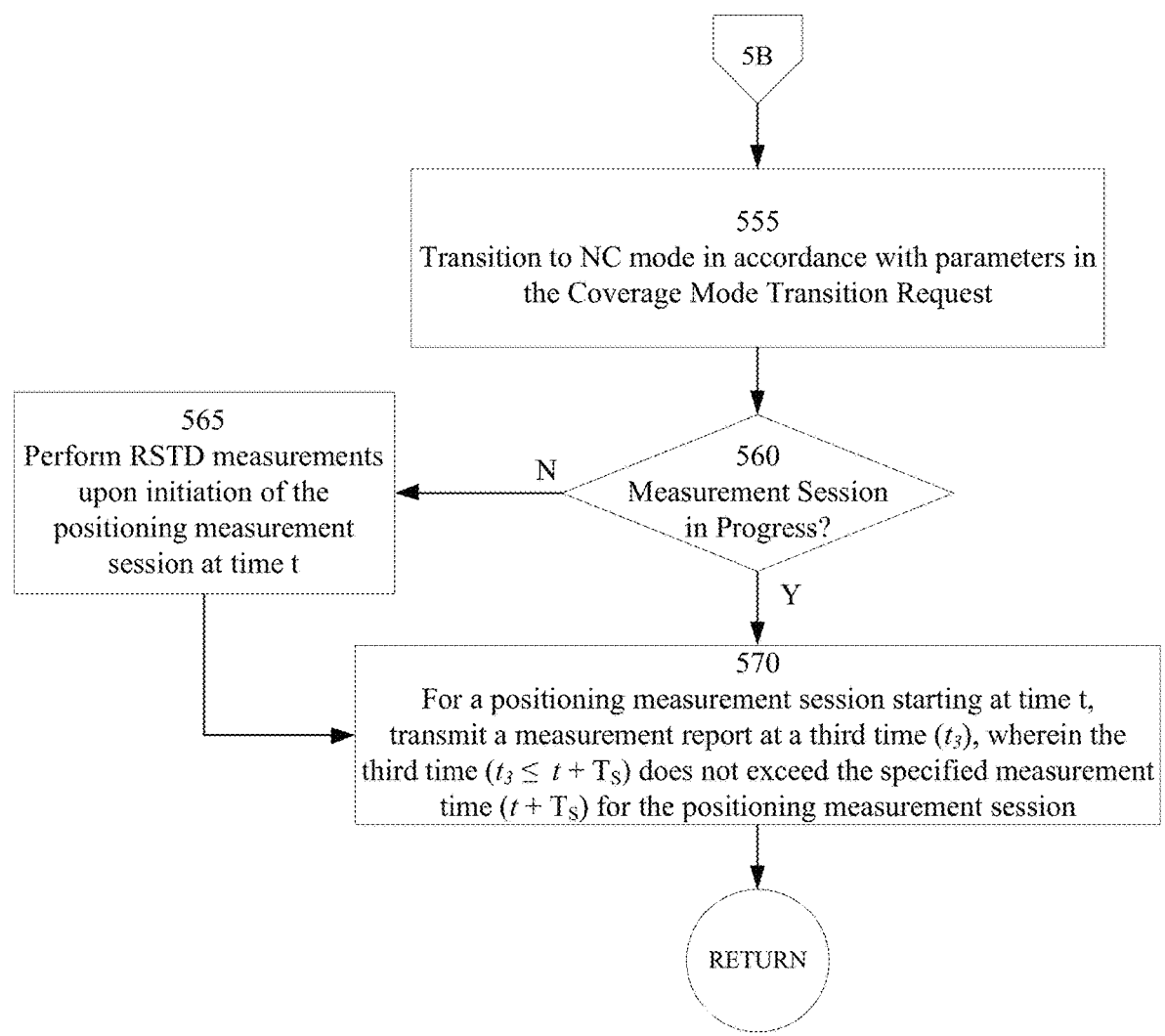

FIG. 5A and FIG. 5B show a flowchart for an exemplary method 500 to support position determination in accordance with disclosed embodiments. Method 500 may be performed by UE 100 including by one or more of processor(s) 150, CM-CDE 152, and PE 156, and wireless network interface 105. Further, program code implementing method 500 may be stored in computer-readable medium 160 and/or memory 130 and may be read and executed by UE 100 and/or functional elements comprised in UE 100.

In block 510, a coverage mode transition request may be received (e.g. by UE 100 through wireless communications interface 105) at a first time t1.

In block 520, it may be determined (e.g. by UE 100) whether the received coverage mode transition request requests a transition to an EC mode (e.g. one of EC Mode A or EC Mode B). If the received coverage mode transition request requests a transition to an EC mode ("Y" in block 520), then, in block 525, an expected communication delay $T_{CE-X}$ for transmission of the measurement report may be determined (e.g. by UE 100) based, in part, on the EC mode configuration parameters. For example, if UE is configured to operation in an EC mode with 128 repetitions and 2 UL sub-frames per frame, with a frame duration of 10 ms, then, for the configured EC mode, $T_{CE-X}$ may be determined as $$T_{CE-X} = \frac{256 \text{ repetitions}}{2 UL \text{ sub-frames per frame}} * (\text{frame duration}) =$$

$$128 \text{ frames} * 10 \text{ ms} = 1280 \text{ ms}$$

If the received coverage mode transition request does not request a transition to an EC mode ("N" in block 520), then, block 555 (FIG. 5B) may be invoked.

In block 530, a transition to EC mode may be effected (e.g. by UE 100) in accordance with the configuration parameters in the received coverage mode transition request.

Next, in block 535, it may be determined (e.g. by UE 100) whether a positioning measurement session is in progress. If a positioning measurement session is in progress ("Y" in block 535) then, in block 545, a measurement report may be transmitted at a second time t2, wherein the second time (t2) precedes a specified measurement period, which may be expressed as t2≤t+$T_S$, where t denotes the start time of the positioning measurement session. The measurement period $T_S$ for a positioning measurement session may be specified by one or more of: an appropriate standard, BS 240, LS 250 or another PDE, and/or by negotiation between UE 100 and a network entity (such as LS 250).

In some embodiments, in block 545, the measurement report may be transmitted (e.g. by UE 100) at a second time t2 preceding the measurement timeout time (t+$T_M$) by at least the expected communication delay $T_{CE-X}$, so that the second time t2≤t+($T_M$−$T_{CE-X}$). In some embodiments, the measurement report may be transmitted at a second time t2=t+($T_M$−$T_{CE-X}$).

In some embodiments, the measurement report may be transmitted (e.g. by UE 100) at time t2 upon determination that the time remaining for measurement timeout is less than $T_{CE-X}$. For example, the measurement report may be transmitted (e.g. by UE 100) at time t2 where $t1 \le t2 \le (t+T_S)$, when $t1 > t+(T_M-T_{CE-X})$. In some embodiments, the measurement report may be transmitted (e.g. by UE 100) at time t2 upon receipt of the EC mode transition request at the first time t1.

In some embodiments, in block 545, upon determination that a threshold time period $T_{TH}$ has passed from start of the positioning measurement session at time t, the measurement report may be transmitted (e.g. by UE 100) at time t2 upon receipt of the EC mode transition request so that $(t+T_{TH}) \le t2 \le (t+T_S)$. Accordingly, in some embodiments, the transmission of the measurement report may be triggered by receipt of the EC mode transition request (e.g., when a threshold time period $T_{TH}$ has elapsed from start time t of the positioning measurement session).

If a positioning measurement session is not in progress ("N" in block 535) then, in block 540, RSTD measurements may be performed upon initiation of the positioning measurement session at time t. Next, in block 550, a measurement report may be transmitted (e.g. by UE 100) at time t2 where $t2 > t+(T_M-T_{CE-X})$. Control may then return to the calling routine.

Referring to FIG. 5B, if the received coverage mode transition request does not request a transition to an EC mode ("N" in block 520), then, in block 555, a transition to NC mode may be effected (e.g. by UE 100) in accordance with configuration parameters in the received coverage mode transition request.

Next, in block 560, it may be determined (e.g. by UE 100) whether a positioning measurement session is in progress. If a positioning measurement session is in progress ("Y" in block 560) then, in block 570, a measurement report may be transmitted at a third time t3 no later than the specified measurement time $(t+T_S)$ so that $t3 \le (t+T_S)$, where t denotes the start of the positioning measurement session.

In some embodiments, UE 100 may have previously (prior to the received coverage mode transition request in block 510) been configured in EC mode to transmit the measurement report by time $t2 \le t+(T_M-T_{CE-X})$. However, no repetitions are performed in NC mode, so the entire specified measurement period $T_S$ may be used by UE 100 to improve positioning accuracy upon transition to NC mode. Accordingly, in some embodiments, upon transition to NC mode, in block 570, the measurement report may be transmitted at end of the specified measurement period so that $t3=t+T_S$.

If a positioning measurement session is not in progress ("N" in block 560) then, in block 565, RSTD measurements may be performed upon initiation of the positioning measurement session at time t before proceeding to block 570 (outlined above). Control may then return to the calling routine.

Figure 6A:
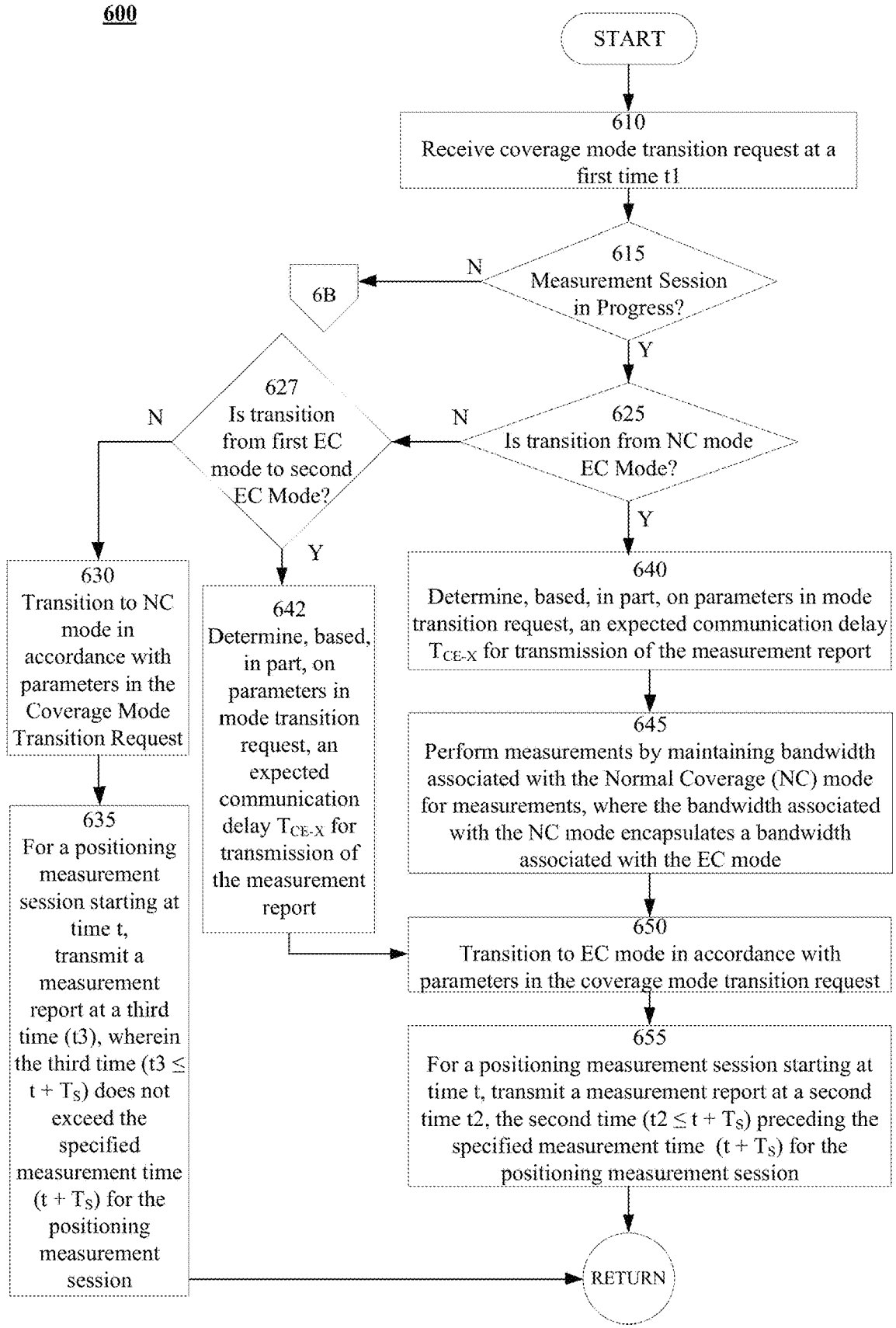
FIG. 6A and FIG. 6B show a flowchart for an exemplary method 600 of position determination in accordance with disclosed embodiments.
Figure 6B:
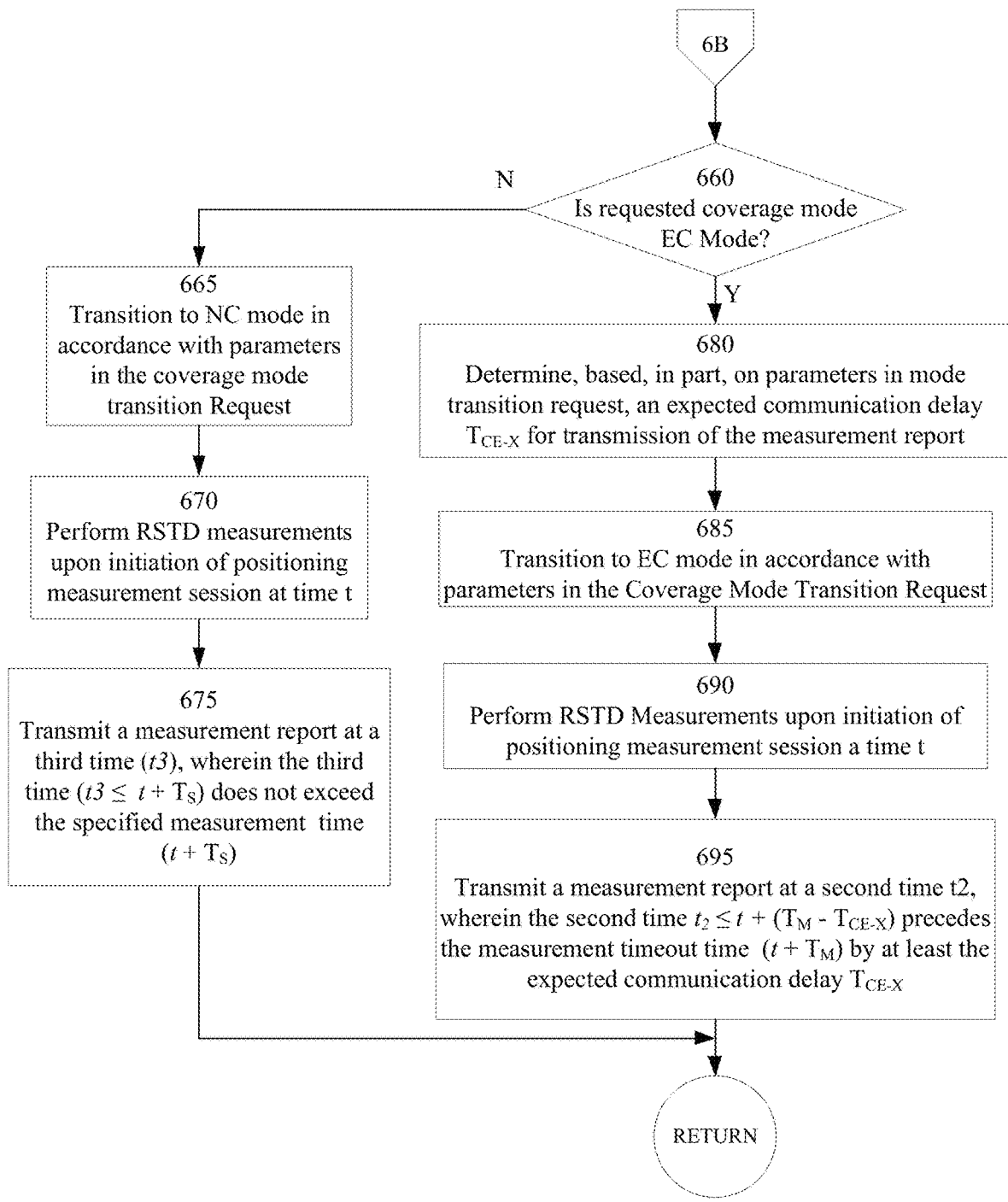

FIG. 6A and FIG. 6B show a flowchart for an exemplary method 600 to support position determination in accordance with disclosed embodiments. Method 600 may be performed by UE 100 including by one or more of processor(s) 150, CM-CDE 152, and PE 156, and wireless network interface 105. Further, program code implementing method 600 may be stored in computer-readable medium 160 and/or memory 130 and may be read and executed by UE 100 and/or functional elements comprised in UE 100.

In block 610, a coverage mode transition request may be received (e.g. by UE 100 through wireless communications interface 105) at a first time t1.

In block 615, it may be determined (e.g. by UE 100) whether a positioning measurement session is in progress. If a positioning measurement session is in progress ("Y" in block 615) then, in block 625, it may be determined (e.g. by UE 100) whether the received coverage mode transition request requests a transition from NC mode to an EC mode (e.g. one of EC Mode A or EC Mode B).

If the received coverage mode transition request requests a transition from NC mode to an EC mode ("Y" in block 625), then, in block 640, an expected communication delay $T_{CE-X}$ for transmission of the measurement report may be determined (e.g. by UE 100) based, in part, on the EC mode configuration parameters. For example, if UE is configured to operation in an EC mode with 128 repetitions and 2 UL sub-frames per frame, with a frame duration of 10 ms, then, for the configured EC mode, $T_{CE-X}$ may be determined as $$T_{CE-X} = \frac{256 \text{ repetitions}}{2 UL \text{ sub-frames per frame}} * (\text{frame duration}) =$$

$$128 \text{ frames} * 10 \text{ ms} = 1280 \text{ ms}$$

In block 645, RSTD measurements may be performed (e.g. by UE 100) by maintaining a bandwidth associated with NC mode, where the bandwidth associated with the NC mode encapsulates a bandwidth associated with the EC mode. For example, in block 645 UE 100 may maintain the wider bandwidth associated with NC mode for RSTD measurement.

As outlined previously, upon transition to EC mode, the bandwidth of the UE may be reduced to 6 RBs scheduled by the network. However, one or more neighboring cells included in the OTDOA assistance data may operate in the wider NC mode frequency band. Therefore, conventionally, upon transitioning to EC mode, UEs may request and use measurement gaps even for infra-frequency RSTD measurements of neighboring cells, which may delay measurements and measurement reporting. In addition, in conventional situations, because of constraints, such as the number of measurement gaps that can be requested, the number of infra-frequency measurements that may be measured during a positioning measurement session can be limited thereby detrimentally affecting positioning accuracy. Moreover, use of measurement gaps for infra-frequency measurement may limit the number of inter-frequency RSTD measurements because of limits on the total number of measurement gaps that may be requested. Thus, conventionally, transitions to NC mode may have a detrimental impact on positioning operations.

In some embodiments, in block 645, by performing RSTD measurements while maintaining a bandwidth associated with NC mode after receipt of the coverage mode transition request, UE 100 may obviate or decrease measurement gap requests for infra-frequency measurements.

In block 650, a transition to EC mode may be effected (e.g. by UE 100) in accordance with the configuration parameters in the received coverage mode transition request.

In block 655, a measurement report may be transmitted at a second time t2, wherein the second time (t2) precedes a specified measurement period, which may be expressed as $t2 \le t+T_S$. The time t denotes the start of the positioning measurement session. The measurement period $T_S$ for a positioning measurement session may be specified in an appropriate standard, by LS 250 or another PDE, and/or by negotiation between UE 100 and a network entity (such as LS 250).

In some embodiments, in block 655, the measurement report may be transmitted (e.g. by UE 100) at a second time t2 preceding the measurement timeout time $(t+T_M)$ by at least the expected communication delay $T_{CE-X}$, so that the second time $t2 \leq t+(T_M-T_{CE-X})$. In some embodiments, the measurement report may be transmitted at a second time $t2=t+(T_M-T_{CE-X})$.

In some embodiments, the measurement report may be transmitted (e.g. by UE 100) at time t2 upon determination that the time remaining for measurement timeout is less than $T_{CE-X}$. For example, when the time of reception of coverage mode transition request $t1>t+T_M-T_{CE-X}$, then, the measurement report may be transmitted (e.g. by UE 100) at time t2 where $t1 \leq t2 \leq (t+T_S)$, when $t1>t+(TM-T_{CE-X})$. In some embodiments, the measurement report may be transmitted (e.g. by UE 100) at time t2 upon receipt of the EC mode transition request at the first time t1.

In some embodiments, in block 655, upon determination that a threshold time period $T_{TH}$ has passed from start of the positioning measurement session at time t, the measurement report may be transmitted (e.g. by UE 100) at time t2 upon receipt of the EC mode transition request so that $(t+T_{TH}) \leq t2 \leq (t+T_S)$. Accordingly, in some embodiments, the transmission of the measurement report may be triggered by receipt of the EC mode transition request.

If the received coverage mode transition request is not a request to transition to an EC mode from NC mode ("N" in block 625), then, in block 627, it may be determined if the coverage mode transition request requests a transition from a first EC mode (e.g. EC Mode A) to a second EC mode (e.g. EC Mode B). If the coverage mode transition request requests a transition from a first EC mode to a second EC mode ("Y" in block 627), then, in block 642, $T_{CE-X}$ may be re-determined based on the (new) parameters in the coverage mode transition request. For example, the number of repetitions (or another parameter) may change between the EC modes (e.g. between the current EC mode and the requested EC mode), which may result in a different value of the expected communication delay $T_{CE-X}$. Next, block 650 (outlined above) may be invoked.

If the coverage mode transition request requests a transition to NC mode ("N" in blocks 625 and 627), then, in block 630, a transition to NC mode may be effected (e.g. by UE 100) in accordance with configuration parameters in the received coverage mode transition request.

In block 635, a measurement report may be transmitted at a third time t3 no later than the specified measurement period $(t+T_S)$ so that $t3 \leq (t+T_S)$. In some embodiments, in block 570, the measurement report may be transmitted at end of the specified measurement period so that $t3 \leq t+T_S$.

In some embodiments, UE 100 may have previously (prior to the received coverage mode transition request in block 610) been configured in EC mode to transmit the measurement report by time $t2 \leq t+(T_M-T_{CE-X})$. However, no repetitions are performed in NC mode, so the entire specified measurement period $T_S$ may be used by UE 100 to improve positioning accuracy upon transition to NC mode. Accordingly, in some embodiments, upon transition to NC mode, in block 635, the measurement report may be transmitted at end of the specified measurement period so that $t3=t+T_S$. Control may then return to the calling routine.

Referring to FIG. 6B, if a positioning measurement session is not in progress ("N" in block 615) then, in block 660, it may be determined (e.g. by UE 100) whether the received coverage mode transition request requests a transition to an EC mode (e.g. one of EC Mode A or EC Mode B). If the requested coverage mode is EC mode ("Y" in block 660), then, in block 680, an expected communication delay $T_{CE-X}$ for transmission of the measurement report may be determined (e.g. by UE 100) based, in part, on the EC mode configuration parameters in the received coverage mode transition request.

In block 685, a transition to EC mode may be effected in accordance with parameters in the received coverage mode transition request. In block 690, RSTD measurements may be performed (e.g. by UE 100) upon initiation of the positioning measurement session at a start time t.

In block 695, a measurement report may be transmitted (e.g. by UE 100) at a second time t2, where the second time precedes the measurement timeout time $(t+T_M)$ by at least the expected communication delay $T_{CE-X}$, so that the second time $t2 \leq t+(T_M-T_{CE-X})$. In some embodiments, the measurement report may be transmitted (e.g. by UE 100) at time $t2=t+(T_M-T_{CE-X})$. Control may then return to the calling routine.

If the received coverage mode transition request does not request a transition to an EC mode ("N" in block 660), then, in block 665, a transition to NC mode may be effected (e.g. by UE 100) in accordance with configuration parameters in the received coverage mode transition request.

Next, in block 670, RSTD measurements may be performed (e.g. by UE 100) upon initiation of the positioning measurement session at a start time t. Next, in block 675, a measurement report may be transmitted (e.g. by UE 100) at a third time (t3), wherein the third time $(t3 \leq t+T_S)$ does not exceed the specified measurement time $(t+T_S)$. In some embodiments, UE 100 may have previously (prior to the received coverage mode transition request in block 610) been configured in EC mode to transmit the measurement report by time $t2 \leq t+(T_M-T_{CE-X})$. However, no repetitions are performed in NC mode, so the entire specified measurement period $T_S$ may be used by UE 100 to improve positioning accuracy upon transition to NC mode. Accordingly, in some embodiments, upon transition to NC mode, in block 675, the measurement report may be transmitted at end of the specified measurement period so that $t3=t+T_S$. Control may then return to the calling routine.

Figure 7:
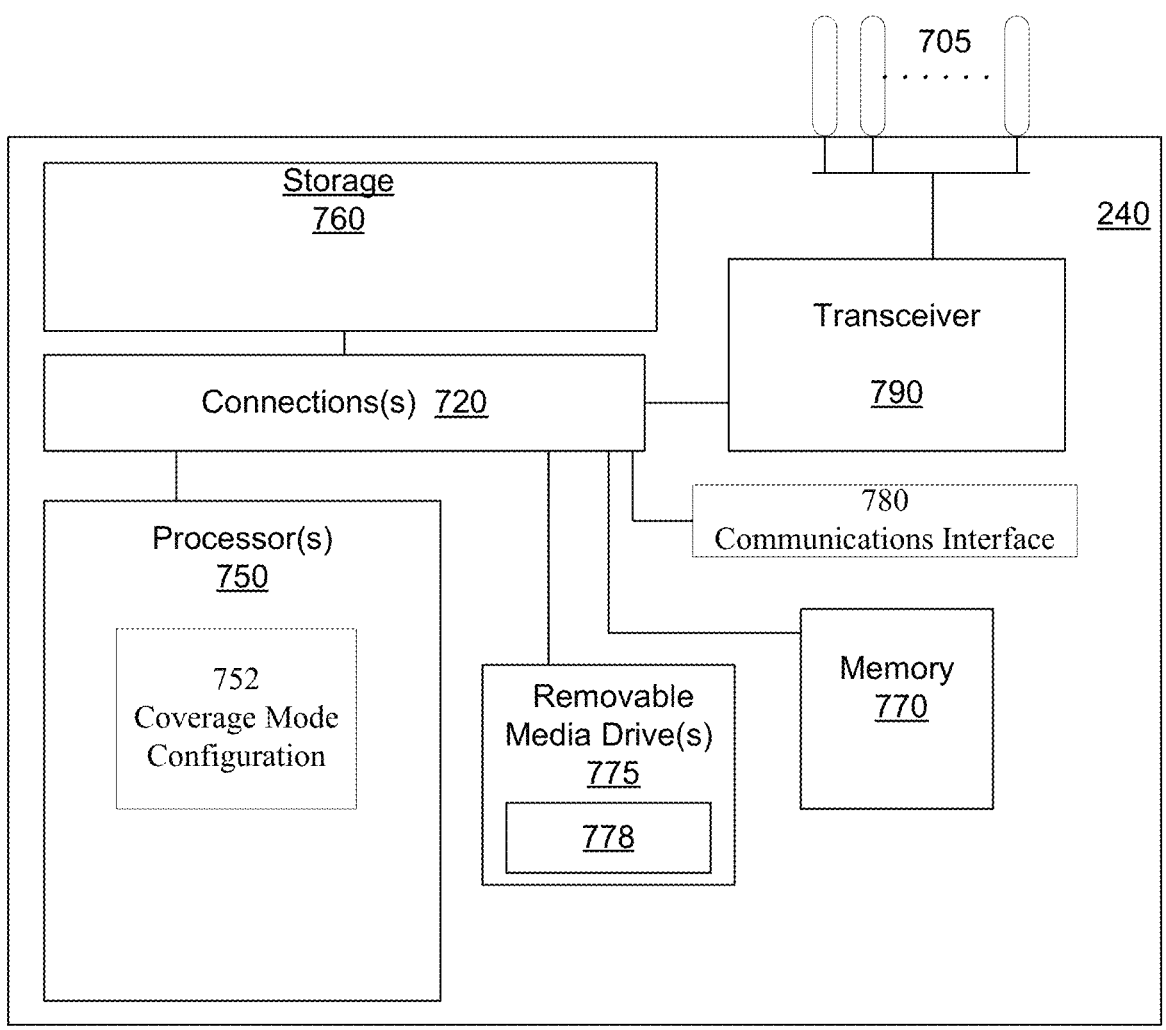
FIG. 7 shows a schematic illustrating some features of an example base station.

FIG. 7 shows a schematic diagram illustrating some features of example BS 240. In some embodiments, BS 240 may be configured to support any of the techniques and methods described herein in relation to FIGS. 4-6B and 9-11. In some embodiments, BS 240 may include and/or control one or more TPs. In some embodiments, BS 240 may communicate with UE 100 over a wireless network (e.g. WWAN and/or WLAN), through a network interface, which may comprise transceiver 790 and/or communications interface 780. BS 240 may transmit PRS (e.g. using transceiver 790), which may be measured and used for UE position determination. In some embodiments, BS 240 may include functionality for a 3GPP evolved NodeB (eNB) or a 3GPP Home eNB.

In some embodiments, BS 240 may transmit information needed to support UE acquisition and measurement of the PRS such as an LTE master information block (MIB) and one or more LTE system information blocks (SIBs) through communications interface 780, transceiver 790, and antennas 705.

In some embodiments, BS 240 may include, for example, one or more processor(s) 750, memory 770, storage 760, communications interface 780 (e.g., a wireline and/or wireless network interface), antennas 705, and removable media drive 775. In some embodiments, the above functional components may be operatively coupled with one or more connections 720 (e.g., buses, lines, fibers, links, etc.). In certain example implementations, some portion of BS 240 may take the form of a chipset, and/or the like.

Communications interface 780 may include support for a variety of wired (or wireline) communication interfaces that support wired transmission and/or reception and, if desired, may additionally or alternatively support transmission and reception of one or more signals over one or more types of wireless communication networks such as LTE radio links, WWANs, WLANs etc. Communication over a WLAN may be supported, in part, by transceiver 790, which may comprise a transmitter and receiver.

Communications interface 780 may also support communication with LS 250 (e.g. E-SMLC) and other entities over wired networks. In some embodiments, BS 240/communications interface 780 may receive clock or timing synchronization information from TPC 140, such as an accurate common time reference (e.g. for GPS, GNSS or UTC time), for accurate (e.g. synchronized) transmission of PRS signals. In one embodiment, communications interface 780 may comprise network interface cards, input-output cards, chips and/or ASICs that implement one or more of the communication functions performed by BS 240. Processor(s) 750 may use some or all of the received information to generate PRS signals, which may be transmitted using transceiver 790 and antennas 705 in a manner consistent with disclosed embodiments.

Processor(s) 750 may be implemented using a combination of hardware, firmware, and software. In some embodiments, processor(s) 750 may facilitate generation of PRS signals for transmission. In some embodiments, processor(s) 750 may include Coverage Mode Configuration Engine (CMCE) 752, which may determine configuration parameters for UEs 100 for a coverage mode. In some embodiments, processor(s) 750 and/or CMCE 752 may estimate the expected communication delay ($T_{CE-X}$) for one or more UEs 100 coupled to BS 240 based on the respective coverage mode parameters for each UE 100.

BS 240 may transmit information in Master Information Block (MIB) and/or System Information Blocks (SIBs), which may be used by UEs 100 to facilitate transition to a newly configured mode. BS 240 may transmit separate instances of SIB1 and SIB2 for NC mode and CE mode AB so that a UE 100 may obtain SIB1 and SIB2 for a newly configured mode prior to transitioning to the newly configured mode. In some embodiments, BS 240 may provide SIB1 and SIB2 information for the newly configured mode in a RadioResourceConfigCommon Information Element (IE) and/or in a MobilityControlInformation IE. For example, one or more of the parameters: fdd-DownlinkOrTddSubframeBitmapBR, fdd-DownlinkOrTddSubframeBitmapBR, fdd-UplinkSubframeBitmapBR, startSymbolBR, and/or other parameters may be used to signal configuration information for the newly configured mode to UE 100. In some embodiments, the configuration information may include the number of repetitions, the number of subframes, the hopping pattern of the 6 RBs, UL-DL SF configuration for half duplex etc. In some embodiments, the configuration information exchanged between UE 100 and BS 140 (e.g. eNB) may further include and/or be modified to include additional IEs such an expected communication delay ($T_{CE-X}$).

In some embodiments, the expected communication delay ($T_{CE-X}$) for a UE 100 may be communicated to LS 250 associated with the UE 100. In some embodiments, BS 240 may determine (e.g. using processor(s) 750 and/or CME 752) an expected communication delay ($T_{CE-X}$) for transmission of a Reference Signal Time Difference (RSTD) measurement report by a UE in the EC mode. In some embodiments, for one or more UEs coupled to BS 240, corresponding expected communication delays ($T_{CE-X}$) may be determined based on the respective EC mode configuration parameters. Further, BS 240 may communicate the expected communication delay ($T_{CE-X}$) to LS 250 (e.g. an E-SMLC). In some embodiments, the expected communication delay (TCE-X) may be sent to LS 250 using a Long Term Evolution Positioning Protocol Annex (LPPa) protocol.

Processor(s) 750 may represent one or more circuits configurable to perform at least a portion of a computing procedure or process related to the generation and/or transmission of network related information such as MIBs/SIBs, configuration and generation of PRS signals, coverage mode configuration, etc.

The methodologies described herein in flow charts and message flows may be implemented by various means depending upon the application. For example, these methodologies may be implemented in hardware, firmware, software, or any combination thereof. For a hardware implementation, the processor(s) 750 and/or CMCE 752 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with micro-code, procedures, functions, and so on that perform the functions described herein. Any machine-readable medium tangibly embodying instructions may be used in implementing the methodologies described herein. For example, software may be stored in memory 770 and/or storage 760, which may support the use of computer-readable media drives 775 including removable media 778. Program code may be resident on computer readable media 778, memory 770, and/or storage 760 and may be read and executed by processor(s) 750.

Memory 770 may be implemented within processor(s) 750 or external to processor(s) 750. As used herein the term "memory" refers to any type of long term, short term, volatile, nonvolatile, or other memory and is not to be limited to any particular type of memory or number of memories, or type of media upon which memory is stored. For example, memory 770, storage 760, and/or computer-readable media 778, may include program code to: generate PRS signals; configure UEs with coverage mode parameters, which may include $T_{CE-X}$; communicate $T_{CE-X}$ to a LS 250 (e.g. E-SMLC using LPPa); support various standards and communication related protocols such as LPPa etc.

Memory 770 and/or storage 760 may represent any data storage mechanism. Memory may include, for example, a primary memory and/or a secondary memory. Primary memory may include, for example, a random access memory, read only memory, non-volatile RAM, etc. While illustrated in this example as being separate from processor(s) 750, it should be understood that all or part of a primary memory may be provided within or otherwise co-located/coupled with processor(s) 750. In some embodiments, storage 760 may form part of secondary memory and may include, for example, similar type of memory as primary memory and/or storage such as hard disk drives, optical disc drives, tape drives, a solid state memory drive, etc.

In certain implementations, secondary memory may be operatively receptive of, or otherwise configurable to couple to a computer-readable medium. As such, in certain example implementations, the methods and/or apparatuses presented herein may take the form in whole or part of a removable media drive 775 that may include computer readable medium 778 with computer implementable instructions stored thereon, which if executed by at least one processor(s) 750 may be operatively enabled to perform all or portions of the example operations as described herein.

Figure 8:
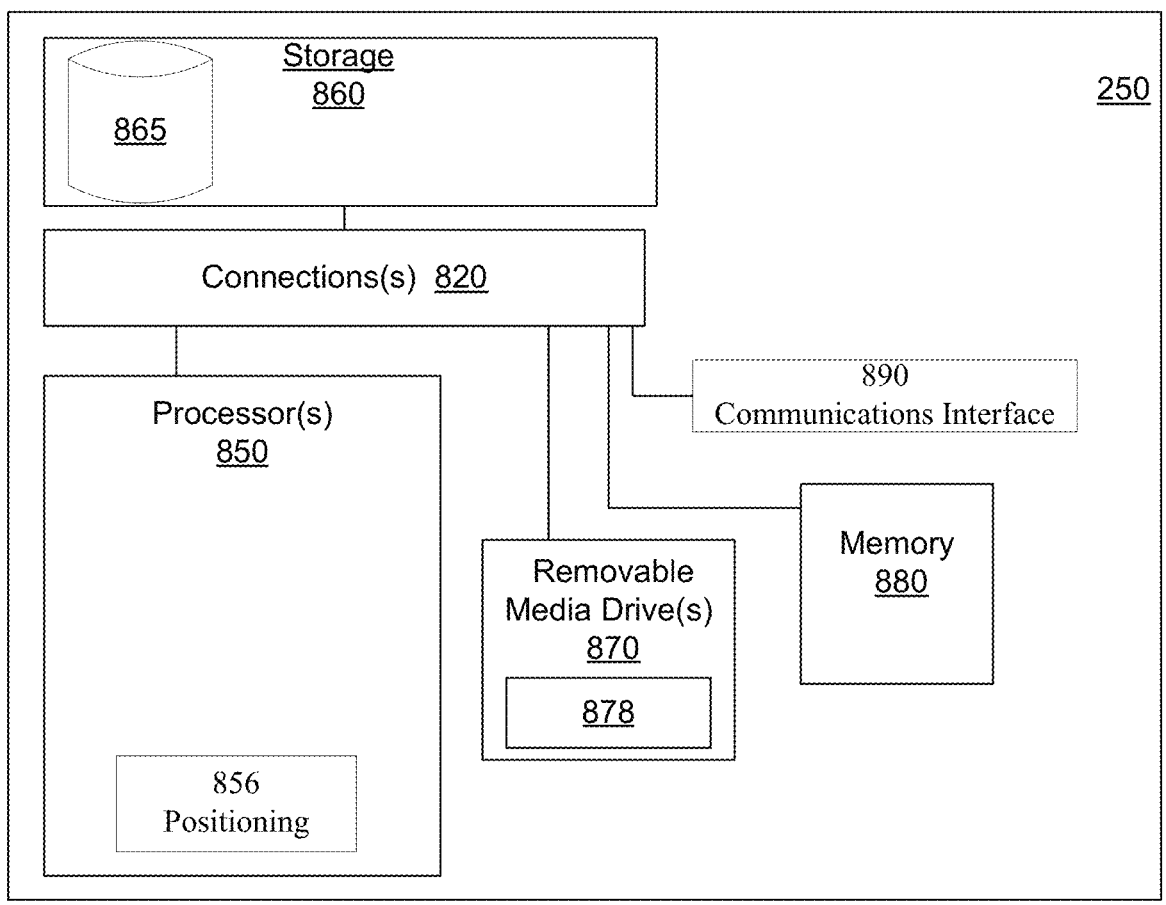
FIG. 8 shows a schematic illustrating some features of an example location server.

Reference is now made to FIG. 8, which is a schematic diagram illustrating some features of a location server (LS) 250. Location server 250 may correspond to SUPL SLP or to an E-SMLC. In some embodiments, location server 250 may support some or all of the methods and techniques described herein associated with FIGS. 4-6B and 9-11.

In some embodiments, location server 250 may include, for example, one or more processor(s) 850, memory 880, storage 860, and communications interface 890 (e.g., a wireline and/or wireless network interface) and removable media drive 870, which may be operatively coupled with one or more connections 820 (e.g., buses, lines, fibers, links, etc.). In certain example implementations, some portion of location server 250 may take the form of a chipset, and/or the like.

Communications interface 890 may include a variety of wired and wireless connections that support wired transmission and/or reception and, if desired, may additionally or alternatively support transmission and reception of one or more signals over one or more types of wireless and/or wireline communication networks. Communications interface 890 may also include interfaces for communication with various other computers and peripherals. For example, in one embodiment, Communications interface 890 may comprise network interface cards, input-output cards, chips and/or ASICs that implement one or more of the communication functions performed by location server 250.

In some embodiments, communications interface 890 may also interface with cellular network entities to obtain or provide a variety of network and/or UE configuration related information. For example, LS 250 (e.g. E-SMLC) may receive an expected communication delay $T_{CE-X}$ for one or more UEs 100 communicatively coupled to LS 250 and BS 240 from the BS 240 (e.g. an eNB). In some embodiments, the expected communication delay $T_{CE-X}$ and/or other parameters received by LS 250 from BS 240 may be received by LS 250 (e.g. from BS 240) using messages based on the LPPa protocol. In some embodiments, LS 250 may adjust and/or alter the measurement timeout time ($T_M$) based on the expected communication delay $T_{CE-X}$ for a UE 100 communicatively couple to LS 250.

Communications interface 890 may make use of the LPPa protocol defined in 3GPP TS 36.455 or a modification of this protocol to obtain (or provide) PRS configuration information, timing and/or other information from (or to) BS 240. Information may also be sent to a UE 100 using the LPP or LPP/LPPe protocol.

Processor(s) 850 may be implemented using a combination of hardware, firmware, and software. Processor(s) 850 may request and receive PRS configuration information for BS 240 and location information for BS 240. Further, processor(s) 850 may use some or all of the information (e.g.) to generate OTDOA assistance data for UEs 100, which may be transmitted using LPP or LPP/LPPe in a manner consistent with disclosed embodiments. For example, processor(s) 850 may generate the OTDOA assistance information as Long Term Evolution (LTE) Positioning Protocol (LPP) or LPP extensions (LPPe) messages. In some embodiments, the RSTD measurements obtained by UE 100 may be based on OTDOA assistance data sent by LS 250.

In some embodiments, processor(s) 850 and/or LS Positioning Engine (PE) 856 may compute the location of a UE 100 based on RSTD measurements obtained by UE 100. For example, UE 100 may obtain RSTD measurements and provide the RSTD measurements to LS 250 in a measurement report. Based, in part, on the RSTD measurements in the measurement report, processor(s) 850 and/or PE 856 may compute a location of UE 100. In some embodiments, processor(s) 850 may represent one or more circuits configurable to perform at least a portion of a computing procedure or process related to the operation of LS 250.

In some embodiments, LS 250 and/or one or more of: processor(s) 850, PE 856 may determine a location of a UE 100. For example, LS 250 and/or processor(s) 850 may exchange signaling information with a BS 240 (e.g. eNB or Home eNB) comprising PRS configuration parameters, and/or respective expected communication delays $T_{CE-X}$ for one or more UEs 100 communicatively coupled to LS 250. In some embodiments, the first signaling information may be exchanged using the 3GPP LTE Positioning Protocol A (LPPa).

Further, in some embodiments, LS 250 and/or processor(s) 850 may send OTDOA assistance data, which may include the corresponding expected communication delay $T_{CE-X}$ to UE 100 (e.g. using communications interface 890). Further, LS 250 and/or processor(s) 850 may receive a measurement report with RSTD measurement information from one or more UEs 100. For the 3GPP LTE radio access type, the signaling information with UEs 100 may be communicated using the 3GPP LTE Positioning Protocol (LPP). For example, the signaling information may be comprised in an LPP Provide Assistance Data message, or an LPP Provide Location Information message.

A location of UE 100 may be determined by the LS 250 (e.g. by processor(s) 850 or Positioning Engine 856) based on information in the measurement report. The location of UE 100 may be forwarded to the requesting entity (e.g. LCS client). In some embodiments, the location of the UE 100 may be determined based on the RSTD measurements (e.g. by LS 250) using the 3GPP observed time difference of arrival (OTDOA) position method.

The methodologies described herein in flow charts and message flows may be implemented by various means depending upon the application. For example, these methodologies may be implemented in hardware, firmware, software, or any combination thereof. For a hardware implementation, the processor(s) 850 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with microcode, procedures, functions, and so on that perform the functions described herein. Any machine-readable medium tangibly embodying instructions may be used in implementing the methodologies described herein. For example, software may be stored in storage 860 and/or on removable media drive 870, which may support the use of computer-readable media 878. Program code may be resident on computer readable media 878 or memory 880 and may be read and executed by processor(s) 850. Memory 880 may be implemented within processor(s) 850 or external to processor(s) 850. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code computer-readable medium 878 and/or memory 880. Examples include computer-readable media encoded with a data structure and computer-readable media encoded with a computer program. For example, computer-readable medium 878 including program code stored thereon may include program code to support LPPa, LPP, PRS configuration, reception of the expected communication delays $T_{CE-X}$ for UEs 100, information processing, generation of OTDOA assistance information, location determination based on RSTD measurements, and interfacing with one or more network entities in a manner consistent with disclosed embodiments.

Computer-readable media 878 may include a variety of physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Other embodiments of computer readable media include flash drives, USB drives, solid state drives, memory cards, etc. Combinations of the above should also be included within the scope of computer-readable media.

Memory 880 may represent any data storage mechanism. Memory 880 may include, for example, a primary memory and/or a secondary memory. Primary memory may include, for example, a random access memory, read only memory, non-volatile RAM, etc. While illustrated in this example as being separate from processor(s) 850, it should be understood that all or part of a primary memory may be provided within or otherwise co-located/coupled with processor(s) 850. Secondary memory may include, for example, the same or similar type of memory as primary memory and/or storage 860 such as hard disk drives, optical disc drives, tape drives, a solid state memory drive, etc. In some embodiments, storage 860 may comprise one or more databases 865 that may hold information pertaining to various entities in system 200 (e.g. eNB 104) and/or the broader cellular network. In some embodiments, information in the databases may be read, used, and/or updated by processor(s) 850 during various computations, including storing capabilities of UE 100, capabilities of LS 250, generating OTDOA assistance data, computing a location of UE 100, etc.

In certain implementations, secondary memory may be operatively receptive of, or otherwise configurable to couple to a computer-readable medium 878. As such, in certain example implementations, the methods and/or apparatuses presented herein may take the form in whole or part of a removable media drive 870 that may include computer readable medium 878 with computer implementable instructions stored thereon, which if executed by at least one processor(s) 878 may be operatively enabled to perform all or portions of the example operations as described herein.

Figure 9:
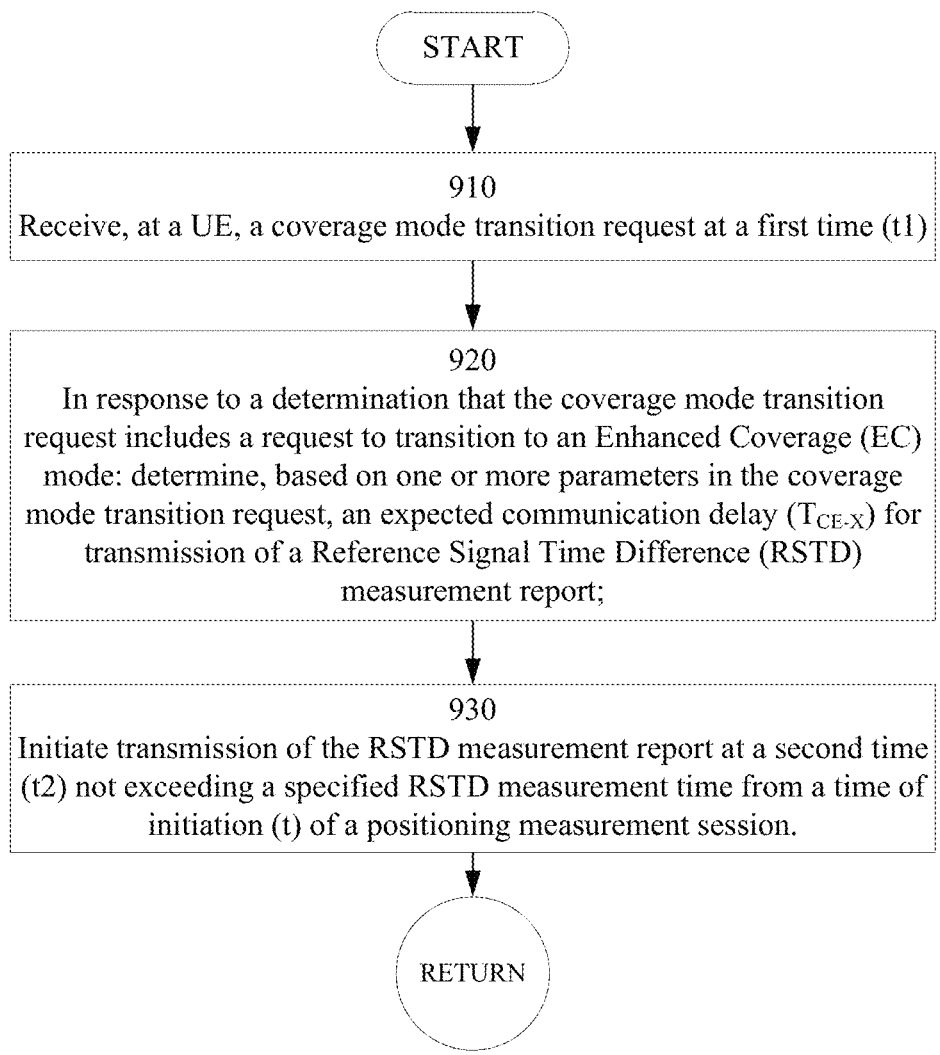
FIG. 9 shows a flowchart for an exemplary method of position determination in accordance with disclosed embodiments.

FIG. 9 shows a flowchart for an exemplary method 900 of position determination in accordance with disclosed embodiments. Method 900 may be performed by UE 100 including by one or more of processor(s) 150, CM-CDE 152, and Positioning Engine 156, and wireless network interface 105. Further, program code implementing method 900 may be stored in computer-readable medium 160 and/or memory 130 and may be read and executed by UE 100 and/or functional elements comprised in UE 100.

In block 910, a coverage mode transition request may be received (e.g. by UE 100) through wireless communications interface 105) at a first time t1.

In block 920, in response to a determination that the coverage mode transition request includes a request to transition to an Enhanced Coverage (EC) mode: an expected communication delay ($T_{CE-X}$) for transmission of a Reference Signal Time Difference (RSTD) measurement report may be determined (e.g. by UE 100) based on one or more parameters in the coverage mode transition request; and in block 930, transmission of the RSTD measurement report may be initiated (e.g. by UE 100) at a second time (t2) not exceeding a specified RSTD measurement time (t+$T_S$) from a time of initiation (t) of a positioning measurement session. Accordingly, for a positioning measurement session starting at time t, the second time t2 may be expressed as t2≤(t+$T_S$). In some embodiments, when the coverage mode transition request is received by the UE in a Normal Coverage (NC) mode, and when the first time (t1) precedes an NC mode RSTD measurement timeout time by at least the expected communication delay (TCE-X), the second time (t2) may further precede the NC mode RSTD measurement timeout time by at least the expected communication delay ($T_{CE-X}$). In some embodiments, initiating transmission of the RSTD measurement report at the second time (t2) may comprise: transitioning, by the UE, to the EC mode; and initiating, subsequent to the transition to the EC mode, transmission of the RSTD measurement report at the second time (t2). In some embodiments, the one or more parameters in the coverage mode transition request may comprise a number of repetitions.

In some embodiments, the second time (t2) may precede an RSTD measurement timeout time ($T_M$) by at least the expected communication delay ($T_{CE-X}$). For example, for a positioning measurement session starting at time t, the second time t2 may be written as t2≤t+($T_M$−$T_{CE-X}$). The RSTD measurement timeout period may be specified in a relevant standard, by BS 240 and/or LS 250, and/or by negotiation between UE and a network entity.

In some embodiments, when the first time (t1) does not precede an RSTD measurement timeout time by at least the expected communication delay ($T_{CE-X}$), transmission of the RSTD measurement report may be initiated upon determination of the expected communication delay ($T_{CE-X}$). For example, for a positioning measurement session starting at time t, when the first time t1>t+($T_M$−$T_{CE-X}$), then, transmission of the RSTD measurement report may be initiated upon determination of the expected communication delay ($T_{CE-X}$).

In some embodiments, initiating transmission of the RSTD measurement report at the second time (t2) may comprise: determining, upon receipt of the coverage mode transition request, that a threshold time period ($T_{TH}$) has passed from a time of initiation (t) of a current positioning measurement session, wherein the threshold time period ($T_{TH}$≤$T_S$) is less than a specified RSTD measurement time period ($T_S$); and initiating transmission of the RSTD measurement report at the second time (t2), wherein the second time (t2≥t+$T_{TH}$) exceeds the time of initiation (t) of the current positioning measurement session by at least the threshold time period ($T_{TH}$). In some embodiments, the transmission of the measurement report may be triggered by receipt of the EC mode transition request.

In some embodiments, initiating transmission of the RSTD measurement report at the second time (t2) may comprise: maintaining, by the UE, a bandwidth associated with the Normal Coverage (NC) mode for measurements during the positioning measurement session, wherein the bandwidth associated with the NC mode encapsulates a bandwidth associated with the EC mode; transitioning, by the UE, to the EC mode; and initiating subsequent to the transition to the EC mode, transmission of the RSTD measurement report at the second time (t2). In some embodiments, the second time (t2) may precede the RSTD measurement timeout time by at least the expected communication delay ($T_{CE-X}$).

In some embodiments, method 900 may further comprise: in response to a determination that the coverage mode transition request includes a request to transition to a Normal Coverage (NC) mode, transitioning, by the UE, to the NC mode; and initiating transmission of the RSTD measurement report at a third time (t3), wherein the third time (t3≤t+$T_S$) does not exceed the specified RSTD measurement time (t+$T_S$). In some embodiments, the third time (t3) may correspond to the specified RSTD measurement time (t+$T_S$).

Figure 10:
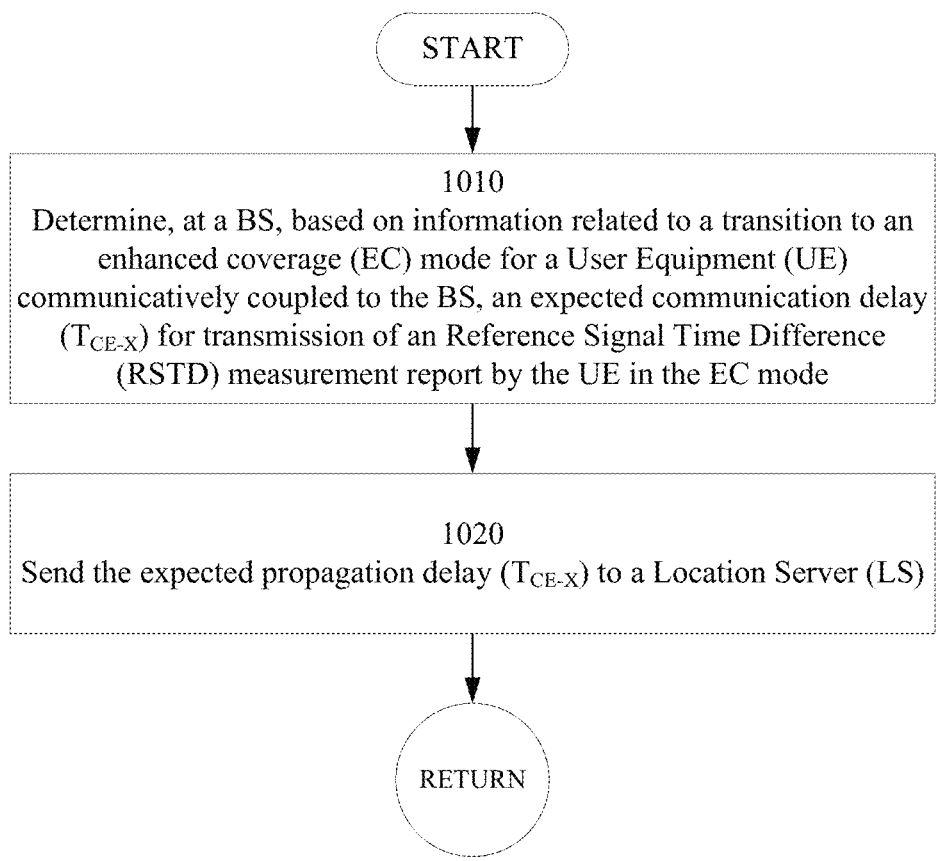
FIG. 10 shows a flowchart of an exemplary method to support UE position determination based on a UE coverage mode in accordance with disclosed embodiments.

FIG. 10 shows a flowchart of an exemplary method 1000 to support UE position determination based on a UE coverage mode in accordance with disclosed embodiments. Method 1000 may be performed by BS 240 (such as an eNB) including by one or more of processor(s) 750, CMCE 752, and/or communications interface 780. Further, program code implementing method 1000 may be stored in computer-readable medium 778 and/or memory 770 and may be read and executed by processor(s) 750, and/or other functional elements comprised in BS 240.

In block 1010, based on information related to a transition to an enhanced coverage (EC) mode for a User Equipment (UE) 100 communicatively coupled to a BS 240, the BS 240 may determine an expected communication delay ($T_{CE-X}$) for transmission of an Reference Signal Time Difference (RSTD) measurement report by the UE 100 in the EC mode. In some embodiments, the information related to the transition to the enhanced coverage (EC) mode by UE 100 may comprise a number of repetitions of messages sent by the UE in the EC mode and/or an uplink transmission pattern for UE 100. The uplink transmission pattern for UE 100 may include information related to valid uplink subframes and/or the number of uplink subframes per frame transmitted by the UE 100.

In block 1020, BS 240 may send a message comprising the expected communication delay ($T_{CE-X}$) to a Location Server (LS) 250. In some embodiments, the message may further comprise an indication that the expected communication delay ($T_{CE-X}$) is related to the transition to the EC mode by the UE. In some embodiments, the LS 250 may comprise an Evolved Serving Mobile Location Center (E-SMLC); and the BS 240 may comprise an Evolved Node B (eNB). In some embodiments, the message, which may comprise the expected communication delay ($T_{CE-X}$) and/or the indication that the expected communication delay ($T_{CE-X}$) is related to the transition to the EC mode by the UE, may be sent to the BS 240 using a Long Term Evolution Positioning Protocol Annex (LPPa) protocol. In some embodiments, the LPPa message exchanges between BS 240 (e.g. eNB) and LS 250 (e.g. E-SMLC) may occur through the addition of functions or procedures to the LPPa protocol and/or through the modification of one or more existing functions or procedures.

Figure 11:
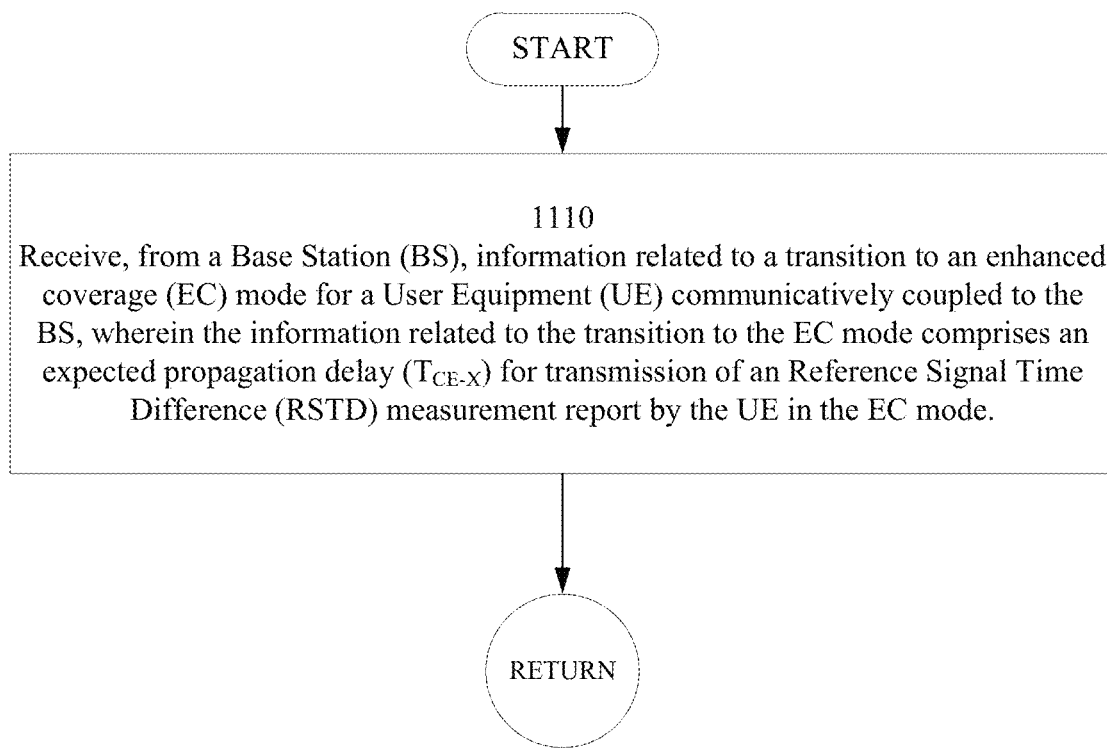
FIG. 11 shows a flowchart of an exemplary method to support UE position determination based on a UE coverage mode in accordance with disclosed embodiments.

FIG. 11 shows a flowchart of an exemplary method 1100 to support UE position determination based on a UE coverage mode in accordance with disclosed embodiments. Method 1100 may be performed by LS 250 (such as an E-SMLC) including by one or more of processor(s) 850, Positioning Engine 856, and/or communications interface 890. Further, program code implementing method 1100 may be stored in computer-readable medium 878 and/or memory 880 and may be read and executed by processor(s) 850, and/or other functional elements comprised in LS 250.

In block 1110, LS 250 may receive, from a Base Station (BS) 240, information related to a transition to an enhanced coverage (EC) mode for a User Equipment (UE) communicatively coupled to the BS, wherein the information related to the transition to the EC mode may comprise an expected communication delay ($T_{CE-X}$) for transmission of an Reference Signal Time Difference (RSTD) measurement report by the UE in the EC mode. In some embodiments, the received information may further comprise an indication that the expected communication delay ($T_{CE-X}$) is related to the transition to the EC mode by the UE.

In some embodiments, the LS 250 may comprise an Evolved Serving Mobile Location Center (E-SMLC); and the BS 240 may comprise an Evolved Node B (eNB). In some embodiments, the information related to the transition to the EC mode may be received using a Long Term Evolution Positioning Protocol Annex (LPPa) protocol. In some embodiments, the LPPa message exchanges between BS 240 (e.g. eNB) and LS 250 (e.g. E-SMLC) may occur through the addition of functions or procedures to the LPPa protocol and/or through the modification of one or more existing functions or procedures.

In some embodiments, LS 250 may adjust and/or alter the measurement timeout time ($T_M$) based on the expected communication delay $T_{CE-X}$ for a UE 100 communicatively couple to LS 250.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method at a User Equipment (UE) comprising:
  receiving a coverage mode transition request at a first time (t1); and
  in response to a determination that the coverage mode transition request includes a request to transition to an Enhanced Coverage (EC) mode in which a number of repetitions of messages is increased,
    determining, based on one or more parameters in the coverage mode transition request including the number of repetitions of messages to be transmitted by the UE, an expected communication delay ($T_{CE-X}$) for transmission of a Reference Signal Time Difference (RSTD) measurement report for a positioning measurement session, and
    initiating transmission of the RSTD measurement report at a second time (t2) not exceeding a specified RSTD measurement time comprising a maximum specified time period for the UE to perform RSTD measurements.

2. The method of claim 1, wherein the second time (t2) further precedes an RSTD measurement timeout time for the positioning measurement session by at least the expected communication delay ($T_{CE-X}$).

3. The method of claim 1, wherein:
the coverage mode transition request is received by the UE in a Normal Coverage (NC) mode,
the first time (t1) precedes an RSTD measurement timeout time for the NC mode by at least the expected communication delay ($T_{CE-X}$), and
the second time (t2) further precedes RSTD measurement timeout time for the NC mode by at least the expected communication delay ($T_{CE-X}$).

4. The method of claim 1, wherein initiating transmission of the RSTD measurement report at the second time (t2) comprises:
initiating transmission of the RSTD measurement report upon determination of the expected communication delay ($T_{CE-X}$), in response to determining that the first time (t1) does not precede an RSTD measurement timeout time by at least the expected communication delay ($T_{CE-X}$).

5. The method of claim 1, wherein initiating transmission of the RSTD measurement report at the second time (t2) comprises:
determining, upon receipt of the coverage mode transition request, that a threshold time period ($T_{TH}$) has passed from a time of initiation (t) of the positioning measurement session, wherein the threshold time period ($T_{TH}$) is less than a specified RSTD measurement time period ($T_S$); and
initiating transmission of the RSTD measurement report at the second time (t2), wherein the second time (t2≥t+$T_{TH}$) further exceeds the time of initiation (t) of the positioning measurement session by at least the threshold time period ($T_{TH}$).

6. The method of claim 1, wherein initiating transmission of the RSTD measurement report at the second time (t2) comprises:
transitioning, by the UE, to the EC mode; and
initiating, subsequent to the transition to the EC mode, transmission of the RSTD measurement report at the second time (t2).

7. The method of claim 1, further comprising:
in response to a determination that the coverage mode transition request includes a request to transition to a Normal Coverage (NC) mode,
transitioning, by the UE, to the NC mode; and
initiating transmission of the RSTD measurement report at a third time (t3), wherein the third time (t3) does not exceed the specified RSTD measurement time.

8. The method of claim 7, wherein the third time (t3) corresponds to the specified RSTD measurement time.

9. The method of claim 1, wherein:
the coverage mode transition request is received by the UE in a Normal Coverage (NC) mode, and,
initiating transmission of the RSTD measurement report at the second time (t2) comprises:
maintaining, by the UE, a bandwidth associated with the Normal Coverage (NC) mode for measurements during the positioning measurement session, wherein the bandwidth associated with the NC mode encapsulates a bandwidth associated with the EC mode;
transitioning, by the UE, to the EC mode; and
initiating, subsequent to the transition to the EC mode, transmission of the RSTD measurement report at the second time (t2).

10. The method of claim 9, wherein the second time (t2) precedes an RSTD measurement timeout time by at least the expected communication delay ($T_{CE-X}$).

11. The method of claim 1, wherein the coverage mode transition request is received during the positioning measurement session with an RSTD measurement timeout period ($T_M$).

12. A User Equipment (UE) comprising:
a transceiver, and
a processor coupled to the transceiver, wherein the processor is configured to:
receive, using the transceiver, a coverage mode transition request at a first time (t1); and
in response to a determination that the coverage mode transition request includes a request to transition to an Enhanced Coverage (EC) mode in which a number of repetitions of messages is increased,
determine, based on one or more parameters in the coverage mode transition request including the number of repetitions of messages to be transmitted by the UE, an expected communication delay ($T_{CE-X}$) for transmission of a Reference Signal Time Difference (RSTD) measurement report for a positioning measurement session, and
initiate transmission of the RSTD measurement report at a second time (t2) not exceeding a specified RSTD measurement time comprising a maximum specified time period for the UE to perform RSTD measurements.

13. The UE of claim 12 wherein the second time (t2) further precedes an RSTD measurement timeout time for the positioning measurement session by at least the expected communication delay ($T_{CE-X}$).

14. The UE of claim 12, wherein:
the coverage mode transition request is received by the UE in a Normal Coverage (NC) mode,
the first time (t1) precedes an RSTD measurement timeout time for the NC mode by at least the expected communication delay ($T_{CE-X}$), and
the second time (t2) further precedes RSTD measurement timeout time for the NC mode by at least the expected communication delay ($T_{CE-X}$).

15. The UE of claim 12, wherein to initiate transmission of the RSTD measurement report at the second time (t2), the processor is configured to:
initiate transmission of the RSTD measurement report upon determination of the expected communication delay ($T_{CE-X}$), in response to determining that the first time (t1) does not precede an RSTD measurement timeout time by at least the expected communication delay ($T_{CE-X}$).

16. The UE of claim 12, wherein to initiate transmission of the RSTD measurement report at the second time (t2), the processor is configured to:
determine, upon receipt of the coverage mode transition request, that a threshold time period ($T_{TH}$) has passed from a time of initiation (t) of the positioning measurement session, wherein the threshold time period ($T_{TH}$) is less than a specified RSTD measurement time period ($T_S$); and
initiate transmission of the RSTD measurement report at the second time (t2), wherein the second time (t2≥t+$T_{TH}$) further exceeds the time of initiation (t) of the positioning measurement session by at least the threshold time period ($T_{TH}$).

17. The UE of claim 12, wherein to initiate transmission of the RSTD measurement report at the second time (t2), the processor is configured to:
  transition the UE to the EC mode; and
  initiate, subsequent to the transition to the EC mode, transmission of the RSTD measurement report at the second time (t2).

18. The UE of claim 12, wherein
  the coverage mode transition request is received by the UE in a Normal Coverage (NC) mode, and,
  in response to a determination that the coverage mode transition request includes a request to transition to a Normal Coverage (NC) mode, the processor is further configured to:
  transition the UE, to the NC mode; and
  initiate transmission of the RSTD measurement report at a third time (t3), wherein the third time (t3) does not exceed the specified RSTD measurement time.

19. The UE of claim 18, wherein the third time (t3) corresponds to the specified RSTD measurement time.

20. The UE of claim 12, wherein to initiate transmission of the RSTD measurement report at the second time (t2), the processor is configured to:
  cause the UE to maintain a bandwidth associated with the Normal Coverage (NC) mode for measurements during the positioning measurement session, wherein the bandwidth associated with the NC mode encapsulates a bandwidth associated with the EC mode;
  transition the UE, to the EC mode; and
  initiate, subsequent to the transition to the EC mode, transmission of the RSTD measurement report at the second time (t2).

21. The UE of claim 20, wherein the second time (t2) precedes an RSTD measurement timeout time by at least the expected communication delay ($T_{CE-X}$).

22. The UE of claim 12, wherein the coverage mode transition request is received during the positioning measurement session with an RSTD measurement timeout period ($T_M$).

23. A User Equipment (UE) comprising:
  means for receiving a coverage mode transition request at a first time (t1); and
  in response to a determination that the coverage mode transition request includes a request to transition to an Enhanced Coverage (EC) mode in which a number of repetitions of messages is increased,
    means for determining, based on one or more parameters in the coverage mode transition request including the number of repetitions of messages to be transmitted by the UE, an expected communication delay ($T_{CE-X}$) for transmission of a Reference Signal Time Difference (RSTD) measurement report for a positioning measurement session, and
    means for initiating transmission of the RSTD measurement report at a second time (t2) not exceeding a specified RSTD measurement time comprising a maximum specified time period for the UE to perform RSTD measurements.

24. The UE of claim 23, wherein the second time (t2) further precedes an RSTD measurement timeout time for the positioning measurement session by at least the expected communication delay ($T_{CE-X}$).

25. The UE of claim 23, wherein:
  the coverage mode transition request is received by the UE when in a Normal Coverage (NC) mode, and,
  means for initiating transmission of the RSTD measurement report at the second time (t2) comprises:
    means for maintaining a bandwidth associated with the Normal Coverage (NC) mode for measurements during the positioning measurement session, wherein the bandwidth associated with the NC mode encapsulates a bandwidth associated with the EC mode;
    means for transitioning the UE to the EC mode; and
    means for initiating, subsequent to the transition to the EC mode, transmission of the RSTD measurement report at the second time (t2).

26. A non-transitory computer-readable medium comprising instructions to configure a processor on a User Equipment (UE) to:
  receive a coverage mode transition request at a first time (t1); and,
  in response to a determination that the coverage mode transition request includes a request to transition to an Enhanced Coverage (EC) mode in which a number of repetitions of messages is increased,
    determine, based on one or more parameters in the coverage mode transition request including the number of repetitions of messages to be transmitted by the UE, an expected communication delay ($T_{CE-X}$) for transmission of a Reference Signal Time Difference (RSTD) measurement report for a positioning measurement session, and
    initiate transmission of the RSTD measurement report at a second time (t2) not exceeding a specified RSTD measurement time comprising a maximum specified time period for the UE to perform RSTD measurements.

27. The computer-readable medium of claim 26, wherein the second time (t2) further precedes an RSTD measurement timeout time for the positioning measurement session by at least the expected communication delay ($T_{CE-X}$).

28. The computer-readable medium of claim 26, wherein:
  the coverage mode transition request is received by the UE when in a Normal Coverage (NC) mode, and,
  the instructions to initiate transmission of the RSTD measurement report at the second time (t2) configure the processor to:
    maintain a bandwidth associated with the Normal Coverage (NC) mode for measurements during the positioning measurement session, wherein the bandwidth associated with the NC mode encapsulates a bandwidth associated with the EC mode;
    transition the UE to the EC mode; and
    initiate, subsequent to the transition to the EC mode, transmission of the RSTD measurement report at the second time (t2).

* * * * *